US008914579B2

(12) United States Patent
Maeda et al.

(10) Patent No.: US 8,914,579 B2
(45) Date of Patent: Dec. 16, 2014

(54) ACCESS DEVICE, INFORMATION RECORDING DEVICE, CONTROLLER, AND INFORMATION RECORDING SYSTEM

(75) Inventors: Takuji Maeda, Osaka (JP); Shigekazu Kogita, Osaka (JP); Shinji Inoue, Osaka (JP); Hiroki Etoh, Osaka (JP); Makoto Ochi, Osaka (JP); Masahiro Nakamura, Hyogo (JP)

(73) Assignee: Panasonic Corporation, Osaka (JP)

( * ) Notice: Subject to any disclaimer, the term of this patent is extended or adjusted under 35 U.S.C. 154(b) by 591 days.

(21) Appl. No.: 12/867,543

(22) PCT Filed: Feb. 27, 2009

(86) PCT No.: PCT/JP2009/000886
§ 371 (c)(1),
(2), (4) Date: Aug. 13, 2010

(87) PCT Pub. No.: WO2009/107393
PCT Pub. Date: Sep. 3, 2009

(65) Prior Publication Data
US 2010/0332717 A1 Dec. 30, 2010

(30) Foreign Application Priority Data
Feb. 29, 2008 (JP) .................. 2008-049358

(51) Int. Cl.
G06F 12/00 (2006.01)
G06F 12/02 (2006.01)
G06F 12/08 (2006.01)

(52) U.S. Cl.
CPC ........ G06F 12/0246 (2013.01); G06F 12/0888 (2013.01); G06F 12/0866 (2013.01); G06F 2212/1036 (2013.01); G06F 2212/7203 (2013.01)
USPC .......................................... 711/118; 711/202

(58) Field of Classification Search
CPC G06F 3/0656; G06F 12/0802; G06F 12/0873
USPC ................................ 711/118, 202
See application file for complete search history.

(56) References Cited

U.S. PATENT DOCUMENTS

2005/0005057 A1   1/2005 Wang
2007/0016719 A1*  1/2007 Ono et al. ..................... 711/103
2007/0033364 A1   2/2007 Maeda et al.
2007/0124531 A1   5/2007 Nishihara
2008/0288436 A1* 11/2008 Priya ............................. 706/48

FOREIGN PATENT DOCUMENTS

JP    2004-326165      11/2004
JP    2007-334852      12/2007
WO    2005/043394 A1    5/2005

OTHER PUBLICATIONS

International Search Report for corresponding International Application No. PCT/JP2009/000886 mailed May 26, 2009.

* cited by examiner

Primary Examiner — Gurtej Bansal
(74) Attorney, Agent, or Firm — Renner, Otto, Boisselle & Sklar, LLP.

(57) ABSTRACT

Provided is a method that, in the case of managing areas of a non-volatile memory of an information recording module by a file system, increases the speed of processing for writing file data and file system management information, and furthermore prevents a decrease in the rewriting lifetime of the non-volatile memory. The information recording module (2) is provided with a page cache control unit (217) that stores page cache information (224) in the non-volatile memory (22) of the information recording module (2) and performs control such that a specific physical block is used as a cache when writing small-sized data. Also, an access module (1) is provided with a page cache information setting unit (104) that sets information necessary for page cache control in the information recording module (2). The combination of the access module (1) and the information recording module (2) prevents the execution of needless saving process with use of page caching when writing small-sized data, thereby increasing the speed of writing processing.

20 Claims, 21 Drawing Sheets

FIG. 11

Address management information 221

Address conversion information 222

| Logical block number | Physical block number |
|---|---|
| 0x0000 | 0x0000 |
| 0x0001 | 0x0001 |
| 0x0002 | 0x0002 |
| 0x0003 | 0x0003 |
| .. | .. |

Free block information 223

| Free block number |
|---|
| 0x000E |
| 0x020D |
| 0x020E |
| .. |
| 0x01F3 |

Page cache information 224

| Page cache number | Physical block number | Logical block number | Logical page number |
|---|---|---|---|
| 0x0000 | 0x03F0 | 0x0001 | 0x0000 |
| 0x0001 | 0x0303 | 0x0001 | 0x0008 |
| 0x0002 | 0x01F7 | 0x0003 | 0x0000 |

Address management information 221

Address conversion information 222

| Logical block number | Physical block number |
|---|---|
| 0x0000 | 0x0000 |
| 0x0001 | 0x0001 |
| 0x0002 | 0x0002 |
| 0x0003 | 0x0003 |
| :: | :: |

Free block information 223

| Free block number |
|---|
| 0x020D |
| 0x020E |
| 0x0320 |
| :: |
| 0x03F0 |

Page cache information 224

| Page cache number | Physical block number | Logical block number | Logical page number |
|---|---|---|---|
| 0x0000 | 0x000E | 0x0001 | 0x0000 |
| 0x0001 | 0x0303 | 0x0001 | 0x0008 |
| 0x0002 | 0x01F7 | 0x0003 | 0x0000 |

Address management information 221

Address conversion information 222

| Logical block number | Physical block number |
|---|---|
| 0x0000 | 0x0000 |
| 0x0001 | 0x0001 |
| 0x0002 | 0x0002 |
| 0x0003 | 0x0003 |
| :: | :: |

Free block information 223

| Free block number |
|---|
| 0x020D |
| 0x020E |
| 0x0320 |
| :: |
| 0x03F0 |

Page cache information 224

| Page cache number | Logical block number | Logical page number |
|---|---|---|
| 0x0000 | 0x0001 | 0x0000 |
| 0x0001 | 0x0001 | 0x0008 |
| 0x0002 | 0x0003 | 0x0000 |

Physical block number: 0x000E

ACCESS DEVICE, INFORMATION RECORDING DEVICE, CONTROLLER, AND INFORMATION RECORDING SYSTEM

TECHNICAL FIELD

The present invention relates to an access device, an information recording device, a controller, and an information recording system for storing data in a non-volatile memory and manages data as files.

BACKGROUND ART

There are various types of recording media for recording digital data such as music content and video data, examples of which include a magnetic disk, an optical disk, and a magneto-optical disk. Among such recording media, memory cards that use a semiconductor memory such as a flash ROM as the recording element have rapidly become prevalent particularly in compact mobile devices such as digital still cameras and mobile phone terminals, due to the ability of the recording medium to be reduced in size. Moreover, in addition to applications as removable media as with conventional memory cards, semiconductor memory has recently been used in applications as internal device storage, such as incorporating a semiconductor memory such as a flash ROM into a device for use in place of a hard disk.

Mainly a semiconductor element called a NAND-type flash memory is used in such memory cards and internal device storage. A NAND-type flash memory is a recording element that, after previously recorded data has been erased once, can again record different data, and enables configuring an information recording device in which rewriting can be performed multiple times, likewise to conventional hard disks.

Conventionally, data stored in a memory card or internal device storage is managed using a file system. Managing data using a file system enables the data to be shared as a file between devices that can interpret the same file system, and therefore data stored by a user can be easily referenced and copied among multiple devices.

Conventionally, the most commonly used file system is called the FAT file system. The FAT file system is widely used as the file system in flexible disks, PC hard disks, memory cards, and the like due to having the characteristic that area management is performed in a unified manner by a table called a file allocation table (FAT), as well as having a relatively simple structure and being easily implemented.

FIG. 2 shows a configuration of the FAT file system.

Although there are various types of FAT file systems, such as FAT12, FAT16, and FAT32, which differ in the bid width used as the unit of management in the file allocation table, the method of area management using a file allocation table is substantially the same. The following describes FAT16 as an example.

As shown in FIG. 2, a file system management information area 301 exists at the head of a logical address space, and is an area for storing file system management information indicating the unit of area allocation, the size of the area managed by the file system, and the like.

The file system management information area 301 includes file system management information pieces called a master boot record (MBR) partition table 303, a partition boot sector 304, FATs (305 and 306), and a root directory entry 307, and also stores various information pieces necessary for managing a user data area 302.

The MBR partition table 303 is an area for storing information that is for managing a plurality of areas called partitions, into which an area in the logical address space managed by the file system has been divided.

The partition boot sector 304 is an area for storing information regarding management in a partition, such as the size of the unit of area management in the partition.

The FATs (305 and 306) are areas for storing information regarding the storage locations of data included in files, and normally there are two redundant FATs (305 and 306) that have the same information so that even if one of the FATs (305 and 306) is corrupted, files can be accessed using the other one of the FATs (305 and 306).

The root directory entry 307 is an area for storing information (directory entries) regarding files and directories that exist directly under the root directory.

Also, in the FAT file system, the user data area 302 for storing the data of actual files and the like follows the file system management information area 301.

The user data area 302 is divided into and managed in units of management called clusters that have a size of approximately 512 bytes to 32 KB, and data included in files is stored in the clusters. When a file stores a large amount of data, the data is stored across multiple clusters, and the connection between the clusters is managed by link information stored in the FATs (305 and 306).

Also, the information (directory entries) regarding files and subdirectories that exist in the directory directly under the root directory is stored with use of a portion of the user data area 302.

FIG. 3 is a diagram showing a configuration of a directory entry in FAT16.

A 32-byte directory entry 308 is allocated to each file and directory, and stores information regarding the file or directory. Specifically, each time a file or directory is added, information for a 32-byte directory entry 308 is newly created and recorded in the root directory entry 307 area or the user data area 302. The name of the file or directory is stored in eight bytes at the head of the directory entry 308.

The extension is stored in the next three bytes.

The next one byte stores attribute information such as a flag identifying the type of file or directory, or a flag identifying whether the file or directory is read-only.

Also, the directory entry 308 stores, for example, information regarding the last modified date/time of the file or directory, a starting cluster number indicating the location of the start of clusters in which the file or directory itself is stored, and the file size in numbers of bytes.

In this way, since the directory entry 308 holds only information regarding the location of the cluster in which the head data of the file is stored, if the file data is stored across multiple clusters, the location information regarding such clusters is held in the FATs (305 and 306). In other words, in the case of updating a file, in addition to writing the file data, it is necessary to write information in the directory entry 308 and the FATs (305 and 306) as well.

Next is a description of a procedure of processing for writing file data in the FAT file system with reference to FIG. 4.

(S401): read out the directory entry 308 for the target file.

(S402): acquire the starting cluster number stored in the directory entry 308 that was read out, and check the location of the head of the file data.

(S403): read out the FAT (305 or 306) to the RAM of the access module, follow the links in the FAT (305 or 306) in the RAM in order beginning from the file data head location that was acquired in S402, and acquire a writing location cluster number.

(S404): determine whether a new free area needs to be allocated to the file when writing the file data. If a free area needs to be allocated, proceed to the processing of S405. If a free area does not need to be allocated, proceed to the processing of S408.

(S405): search for a free area in the FAT (305 or 306) in the RAM, and acquire a one-cluster free area. Since a value of 0x0000 set in a FAT entry in the FATs (305 and 306) represents that the FAT entry is a free cluster, the processing for acquiring a free area is processing for acquiring a FAT entry having the value 0x0000 in the FAT (305 or 306). Specifically, the FAT entries in the FAT (305 or 306) in the RAM are sequentially referenced, a FAT entry whose value is set to 0x0000 is found, and the value of the cluster number corresponding to the found FAT entry is obtained. In the FAT entry search processing, it is possible to, for example, implement processing in order from the head of the FAT (305 or 306) to the tail, or implement processing starting from the FAT entry after the FAT entry that was previously allocated as a free area, returning to the head of the FAT (305 or 306) when the tail of the FAT (305 or 306) is reached, and then through to the FAT entry that was previously allocated as a free area. In this way, there are no particular limitations on the FAT entry search processing procedure as long as processing for searching for a free area among all the areas in the FAT (305 or 306) area can be realized.

(S406): set the value of the FAT entry corresponding to the free cluster number acquired in S405 to a value representing the link tail. Since a value of 0xFFFF set in a FAT entry in the FAT (305 or 306) represents that the FAT entry is the link tail, processing for setting the value of the corresponding FAT entry to 0xFFFF in the RAM is implemented in S406.

(S407): change the value of the FAT entry corresponding to the cluster number that is the current link tail in the RAM from 0xFFFF to the free cluster number acquired in S405. If a determination has been made in S404 that a free area needs to be acquired, data is added to the tail of the file. In this case, the links to the tail of the file have been followed in the link follow processing performed in S403, and therefore the value of the FAT entry corresponding to the cluster number of the current link tail is set to 0xFFFF, which represents that the FAT entry is the link tail. In the processing of S407, by connecting the link to the free cluster that was newly acquired in S405, the file links become one cluster-worth longer, thus enabling file data to be added.

(S408): write file data in the cluster at the writing location that is currently being referenced. If a determination has been made in S404 that a free area needs to be acquired, the currently referenced writing location is the free cluster that was acquired in S405. Also, if a determination has been made in S404 that a free cluster does not need to be acquired, the currently referenced writing location is the cluster that has been arrived at as a result of following the links in S403.

(S409): determine whether the writing of all of the file data has been completed. If any file data remains, the procedure returns to the processing of S404. On the other hand, if the writing of all of the file data has been completed, the procedure proceeds to the processing of S410.

(S410): update the information regarding the file size, the last modified date/time, and the like that is stored in the directory entry 308, and overwrite the directory entry 308 stored in the non-volatile memory of the information recording module.

(S411): overwrite the FAT (305 or 306) stored in the non-volatile memory of the information recording module with the data of the FAT (305 or 306) in the RAM of the access module, and then the processing is completed.

According to this file data writing processing, in the case of adding 10,000-byte data to "FILE1.TXT" shown in FIG. 5 that includes 60,000 bytes of data, the "FILE1.TXT" changes to a file including 70,000 bytes of data as shown in FIG. 6. Specifically, the cluster having the cluster number 6 is acquired as a free cluster, file data is added thereto, and a link connecting to the cluster number 6 is written to the FAT (305 or 306). As a result, the links of "FILE1.TXT" are updated from a condition of being made up of four clusters having the cluster numbers 2 to 5, to a condition of being made up of five clusters having the cluster numbers 2 to 6.

In this way, in the FAT file system, since file management information pieces are stored in both the FATs (305 and 306) and the directory entry 308, such information pieces also need to be updated when updating a file. Specifically, in the case where the access module updates a file stored in the information recording module, as shown in FIG. 7, the series of writing processing that is implemented includes file data (DATA) writing processing, directory entry 308 (DIR) writing processing, and FAT (305 and 306) (FAT1 and FAT2) writing processing.

In the case of storing a content file such as a high-definition video to the information recording module, the bit rate of the video is high, and therefore even if the directory entry 308 and the FATs (305 and 306) are updated at the rate of, for example, once every several seconds, the file data recording size is relatively large at approximately several MB, and file data is recorded in units of this relatively large recording size. Meanwhile, since only portions of the directory entry 308 and the FATs (305 and 306) in which information is to be updated are written to the information recording module, such information is recorded in units of the relatively small size of approximately 512 bytes to 32 KB.

In the case of using a NAND-type flash memory as the non-volatile memory of the information recording module, data needs to be erased once before other data is recorded. Since the size of the unit of erasing is from several hundred KB to several MB, in the case of implementing writing in units of a small size, "saving process" is executed in which valid data existing in the same physical block is copied to another block. For this reason, with a NAND-type flash memory, there is the problem that the recording speed decreases when writing data in smaller units than the unit of erasing, and this decrease in speed becomes remarkable particularly when writing file system management information such as the aforementioned directory entry 308 and FATs (305 and 306).

Also, in the case of implementing small-sized data writing by the saving process as well, large-sized data writing is executed, and thus there is the problem that the rewriting lifetime of the NAND-type flash memory becomes shorter.

Conventionally, as a method of solving such problems, a method has been proposed in which the access module notifies a data type to the information recording module when data writing is to be performed (e.g., see Patent Citation 1).

In this method (conventional technology), the access module notifies the information recording module, as the data type, whether data is large-sized file data or small-sized file system management information, and based on this notification, the data is sorted into either of two non-volatile memories that are provided in the information recording module and that have different units of management. Accordingly, both file data and file system management information are recorded at a high speed, and furthermore a decrease in the rewriting lifetime of the non-volatile memories can be prevented.

Patent Citation 1: WO 2005/043394A1

DISCLOSURE OF INVENTION

Technical Problem

However, with the conventional technology described above, two non-volatile memories having different units of management need to be provided in the information recording module, and therefore there is the possibility of a rise in cost compared to an information recording module configured by one non-volatile memory as in conventional technology. Also, the non-volatile memory mounting footprint in the information recording module increases in size due to including two non-volatile memories, and therefore there is the possibility of increased difficulty in reducing the size of the information recording module.

The present invention has been achieved in light of the above problems, and an object of the present invention is to provide an access device, an information recording device, a controller, and an information recording system that achieve an increase in the speed of processing for writing file data and file system management information without needing multiple non-volatile memories, and furthermore prevent a decrease in the rewriting lifetime of the non-volatile memory.

Technical Solution

A first aspect of the present invention is an access device that accesses an information recording device having a non-volatile memory that stores data, the access device including a page cache information setting unit.

The page cache information setting unit notifies, to the information recording device, information regarding a specific logical address to which a physical block that temporarily holds data in data writing is to be allocated, before execution of processing for writing data to the information recording device.

With this information recording device, the page cache information setting unit notifies, to the information recording device, information regarding a specific logical address to which a physical block that temporarily holds data in data writing is to be allocated, before execution of processing for writing data to the information recording device, and in the information recording device, data readout/writing processing is performed in accordance with the information and with use of the physical block that temporarily holds the data to be recorded to the specific logical address. This enables efficiently performing processing for reading out and writing small-sized data with use of a physical block that temporarily holds data, and in the case of performing processing for writing a combination of large-sized data and small-sized data, it is possible to suppress the execution of so-called "saving process" and efficiently perform data writing processing. As a result, the data writing speed can be improved.

Note that "access device" is a concept including an access module.

A second aspect of the present invention is the first aspect of the present invention, wherein the page cache information setting unit notifies, to the information recording device, the information regarding a specific logical address in which the number of specific logical addresses has been set the same as the number of physical blocks that temporarily hold data.

With this access device, in the information regarding a specific logical address, the number of specific logical addresses is the same as the number of physical blocks that temporarily hold data, and therefore when performing processing for writing data to a specific logical address with use of this access device, the execution of saving process can be prevented in the information recording device, thereby enabling performing high-speed data writing processing.

A third aspect of the present invention is the first aspect of the present invention, wherein the page cache information setting unit notifies, to the information recording device, the information regarding a specific logical address in which the number of physical blocks that temporarily hold data to be recorded to two or more specific logical addresses has been set to one.

With this access device, in the information regarding a specific logical address, the number of physical blocks that temporarily hold data to be recorded to two or more specific logical addresses is set to 1, thereby enabling reducing the number of physical blocks necessary for performing cache processing. This enables realizing high-speed data writing processing in which the execution of saving process has been suppressed as much as possible, while suppressing the size of the memory area necessary for cache processing.

A fourth aspect of the present invention is any of the first to third aspects of the present invention, wherein each of the specific logical addresses is an address indicating an area in which file system management information is stored.

This enables efficiently performing processing for writing file system management information Note that "file system management information" is, for example, information regarding the FAT in the FAT file system, and information regarding a directory entry.

A fifth aspect of the present invention is an information recording device including a non-volatile memory, a page cache control unit, and a memory control unit.

The non-volatile memory stores data.

A non-volatile memory control unit controls the non-volatile memory. An interface unit performs the transmission and reception of data with an external access unit. The page cache control unit manages, based on page cache information including information that associates a specific logical address and a physical block of the non-volatile memory, a physical block that temporarily holds data to be recorded to the specific logical address. The memory control unit records the page cache information to the non-volatile memory.

With this information recording device, the page cache control unit manages a physical block that temporarily holds data to be recorded to a specific logical address based on page cache information that includes information that associates specific logical addresses and physical blocks in the non-volatile memory, and the memory control unit records the page cache information in the non-volatile memory. This enables efficiently performing processing for reading out and writing small-sized data with use of a physical block that temporarily holds data, and in the case of performing processing for writing a combination of large-sized data and small-sized data, it is possible to suppress the execution of so-called "saving process" and efficiently perform data writing processing. As a result, the data writing speed can be improved.

Note that "information recording device" is a concept including an information recording module.

Also, the "memory control unit" is a functional unit that performs predetermined processing (e.g., data readout/writing processing) on a non-volatile memory. For example, the memory control unit may be realized by hardware, or may be realized by a CPU, a ROM, a RAM, and a non-volatile memory interface unit. Furthermore, the memory control unit may be realized by a combination of hardware and software.

A sixth aspect of the present invention is the fifth aspect of the present invention, further including an interface unit that receives information regarding a specific logical address from an external access device. The page cache information includes information that associates the specific logical address received by the interface unit and a physical block of the non-volatile memory.

This enables page cache information to be set by the external access device.

A seventh aspect of the present invention is the fifth or sixth aspect of the present invention, wherein in the management of a physical block that temporarily holds data to be recorded to a specific logical address, the page cache control unit sets the number of specific logical addresses the same as the number of physical blocks that temporarily hold data.

With this information recording device, the number of specific logical addresses is the same as the number of physical blocks that temporarily hold data, and therefore when performing processing for writing data to a specific logical address with use of this information recording device, the execution of saving process can be prevented, thereby enabling performing high-speed data writing processing.

An eighth aspect of the present invention is the fifth or sixth aspect of the present invention, wherein in the management of a physical block that temporarily holds data to be recorded to a specific logical address, the page cache control unit sets the number of physical blocks that temporarily hold data with respect to two or more specific logical addresses to one.

With this information recording device, the number of physical blocks that temporarily hold data for two or more specific logical addresses is set to one, thereby enabling reducing the number of physical blocks necessary for performing cache processing. This enables realizing high-speed data writing processing in which the execution of saving process has been suppressed as much as possible, while suppressing the size of the memory area necessary for cache processing.

A ninth aspect of the present invention is any of the fifth to eighth aspects of the present invention, wherein each of the specific logical addresses is an address indicating an area in which file system management information is stored.

A tenth aspect of the present invention is a controller that controls an information recording device provided with a non-volatile memory that stores data, the controller including a page cache control unit and a memory control unit.

The page cache control unit manages, based on page cache information including information that associates a specific logical address and a physical block of the non-volatile memory, a physical block that temporarily holds data to be recorded to the specific logical address. The memory control unit records the page cache information to the non-volatile memory.

An eleventh aspect of the present invention is the tenth aspect of the present invention, further including an interface unit that receives information regarding a specific logical address from an external access device. The page cache information includes information that associates the specific logical address received by the interface unit and a physical block of the non-volatile memory.

A twelfth aspect of the present invention is the tenth or eleventh aspect of the present invention, wherein in the management of a physical block that temporarily holds data to be recorded to a specific logical address, the page cache control unit sets the number of specific logical addresses the same as the number of physical blocks that temporarily hold data.

A thirteenth aspect of the present invention is the tenth or eleventh aspect of the present invention, wherein in the management of a physical block that temporarily holds data to be recorded to a specific logical address, the page cache control unit sets the number of physical blocks that temporarily hold data with resepect to two or more specific logical addresses to one.

A fourteenth aspect of the present invention is any of the tenth to thirteenth aspects of the present invention, wherein each of the specific logical addresses is an address indicating an area in which file system management information is stored.

A fifteenth aspect of the present invention is an information recording system having an information recording device and an access device that accesses the information recording device.

The information recording device includes a non-volatile memory and a page cache control unit.

The page cache control unit manages, based on page cache information including information that associates a specific logical address and a physical block of the non-volatile memory, a physical block that temporarily holds data to be recorded to the specific logical address.

The access device includes a page cache information setting unit that notifies, to the information recording device, information regarding a specific logical address to which a physical block that temporarily holds data in data writing is to be allocated, before execution of processing for writing data to the information recording device.

With this information recording system, the page cache information setting unit manages a physical block that temporarily holds data to be recorded to a specific logical address based on page cache information that includes information that associates specific logical addresses and physical blocks in the non-volatile memory, and the page cache information setting unit of the access device notifies, to the information recording device, information regarding a specific logical address allocated to a physical block that temporarily holds the data when data writing is performed, before execution of the processing for writing data to the information recording device. This enables efficiently performing processing for reading out and writing small-sized data with use of a physical block that temporarily holds data, and in the case of performing processing for writing a combination of large-sized data and small-sized data, it is possible to suppress the execution of so-called "saving process" and efficiently perform data writing processing. As a result, this information recording system enables improving the data writing speed.

A sixteenth aspect of the present invention is the fifteenth aspect of the present invention, further including a memory control unit that records the page cache information to the non-volatile memory.

Advantageous Effects

According to the present invention, processing for writing file data and file system management information is performed at high speed without needing multiple non-volatile memories, and furthermore a decrease in the rewriting lifetime of the non-volatile memory can be prevented.

BRIEF DESCRIPTION OF DRAWINGS

FIG. 11 is an illustrative diagram showing an example of address management information before data writing according to Embodiment 1 of the present invention.

FIG. 14 is an illustrative diagram showing an example of address management information after data writing according to Embodiment 1 of the present invention.

FIG. 20 is an illustrative diagram showing an example of address management information after data writing according to Embodiment 2 of the present invention.

Figure 1:
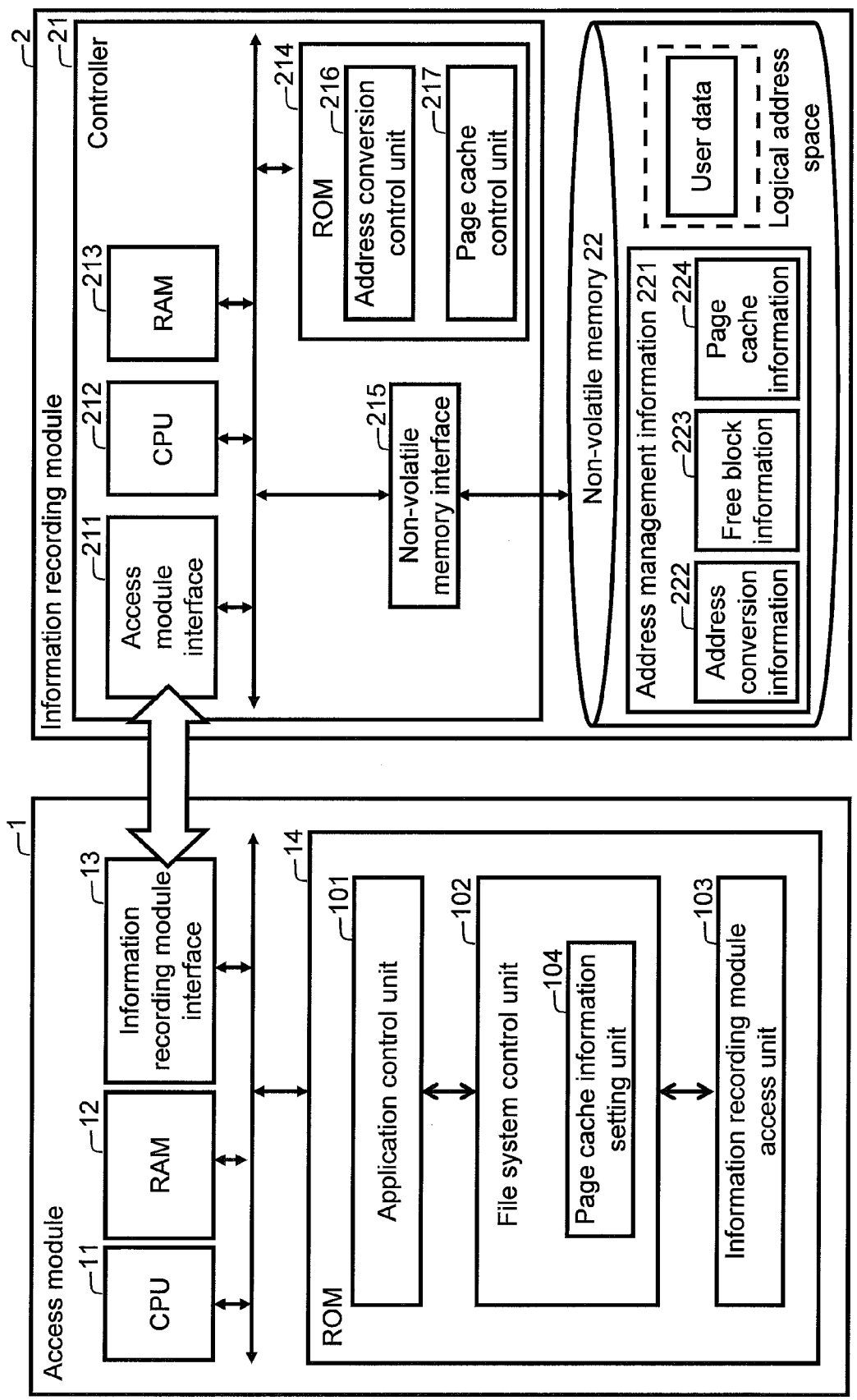
FIG. 1 is an illustrative diagram showing a configuration of an access module and an information recording module according to Embodiment 1 of the present invention.
Figure 2:
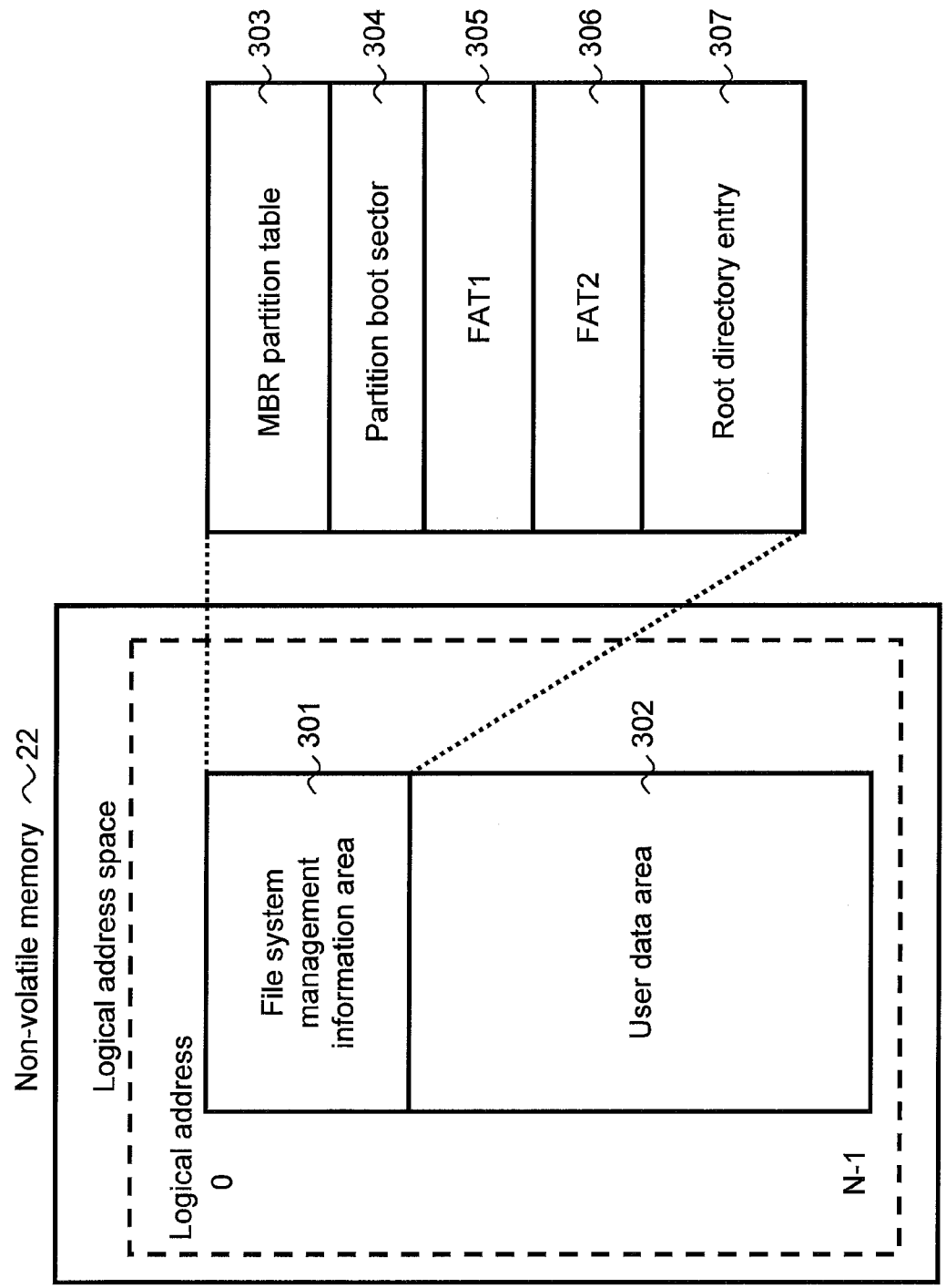
FIG. 2 is an illustrative diagram showing a configuration of a FAT file system.
Figure 3:
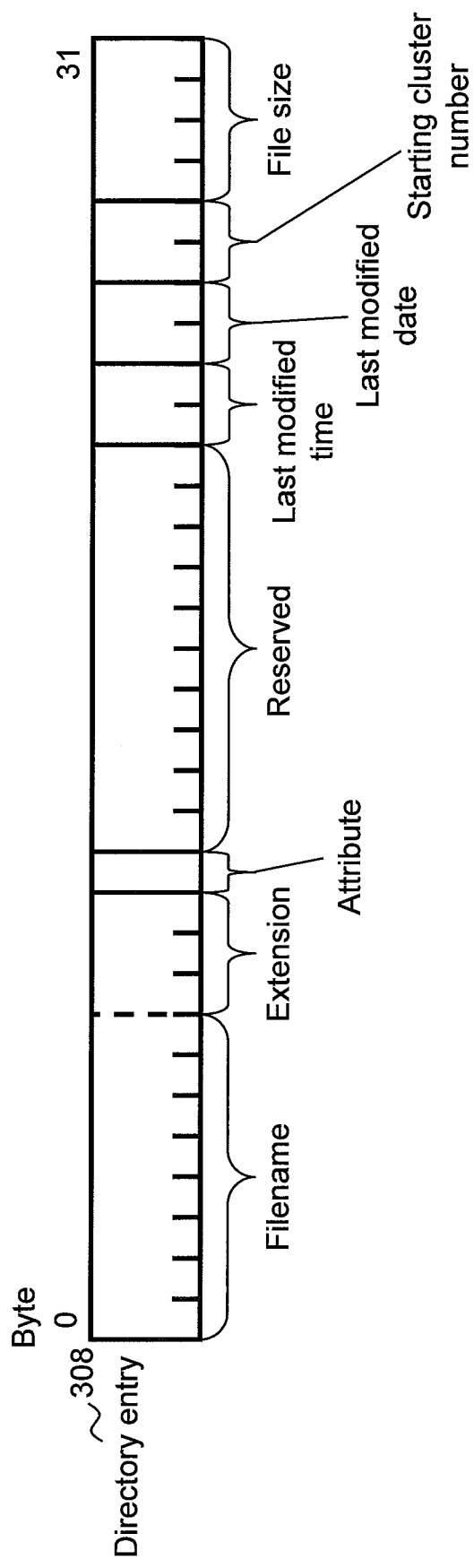
FIG. 3 is an illustrative diagram showing a configuration of a directory entry.
Figure 4:
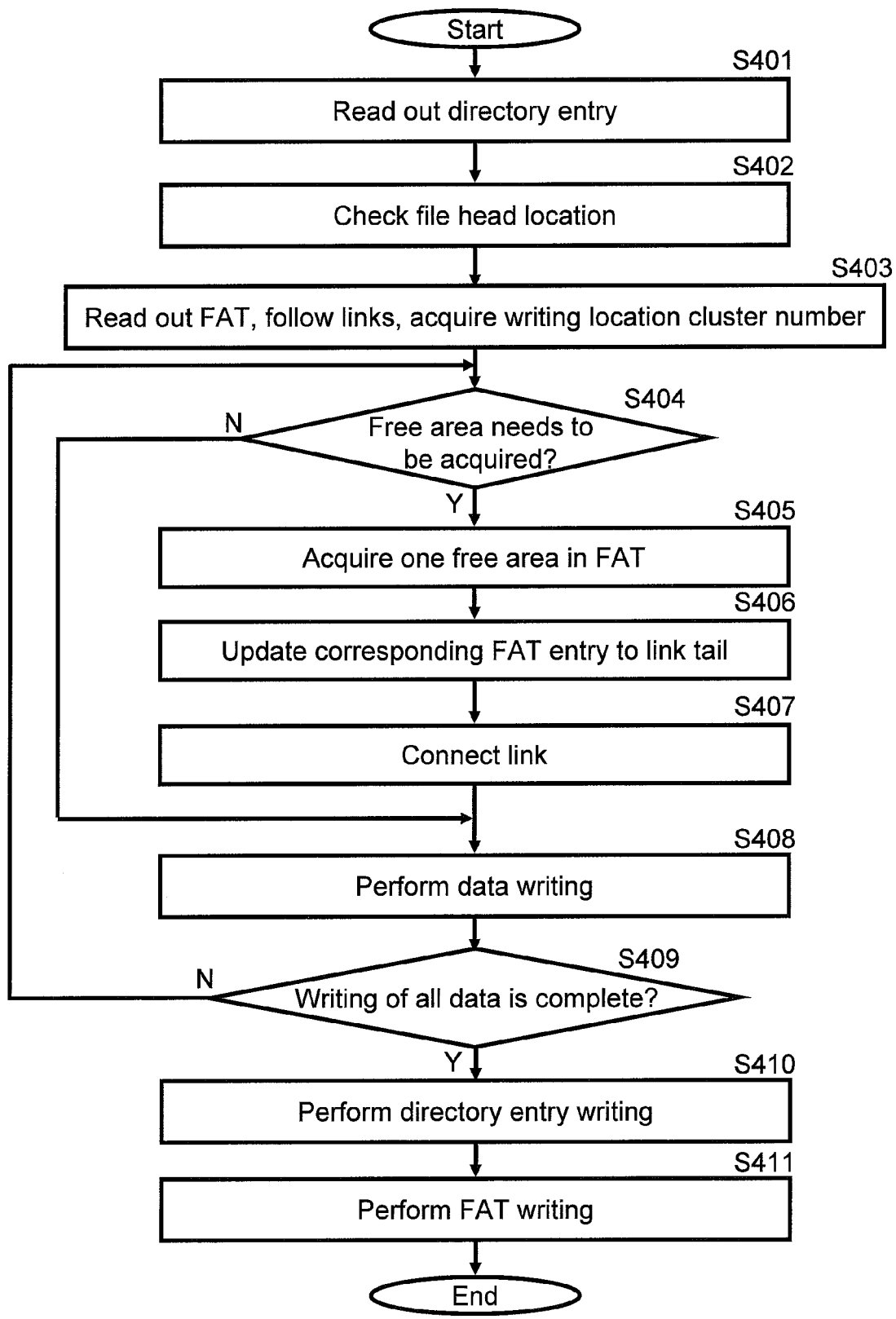
FIG. 4 is a flowchart showing a procedure of processing for writing file data in the FAT file system.
Figure 5:
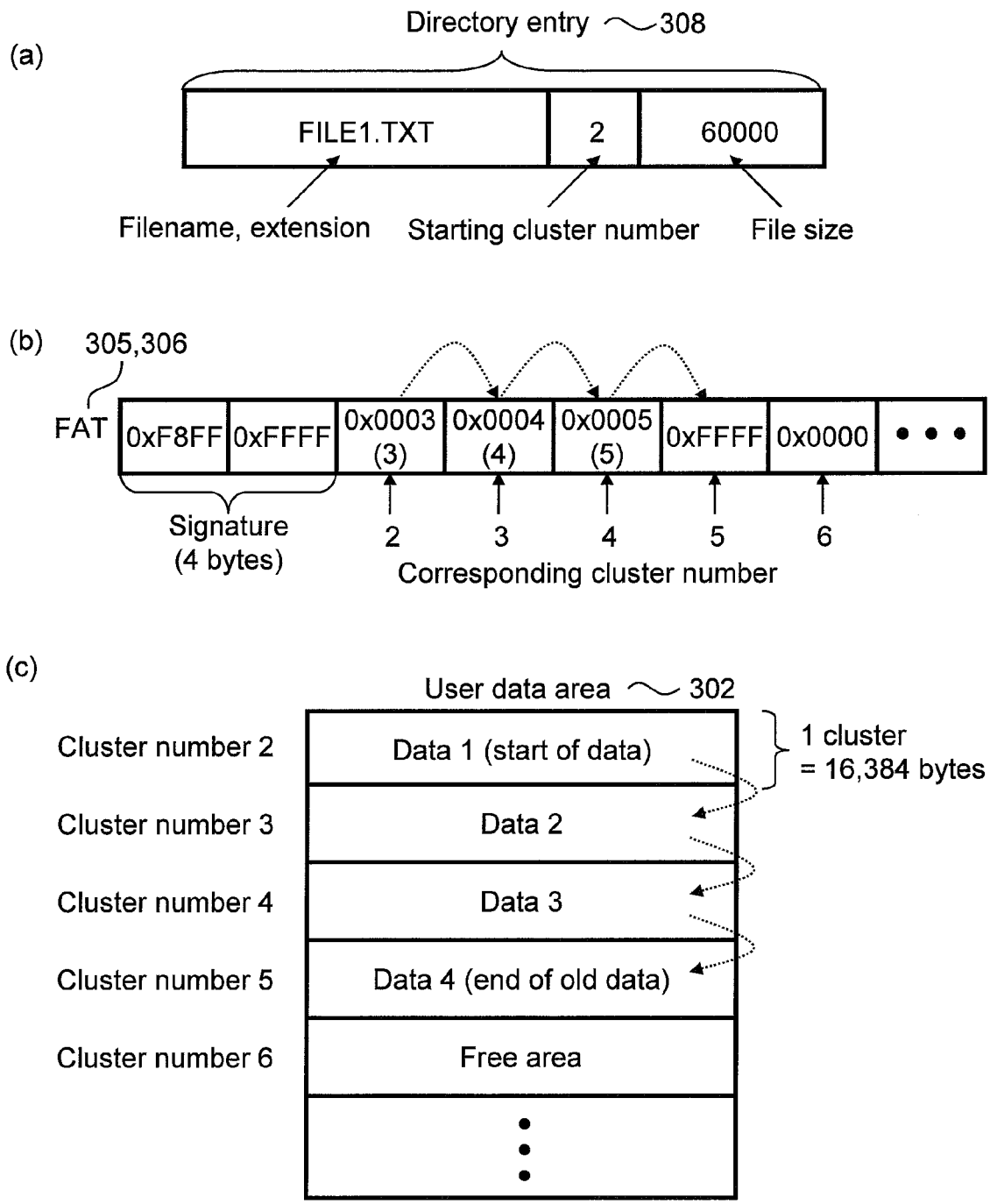
FIG. 5 is an illustrative diagram showing an example of a state before file data writing in the FAT file system.
Figure 6:
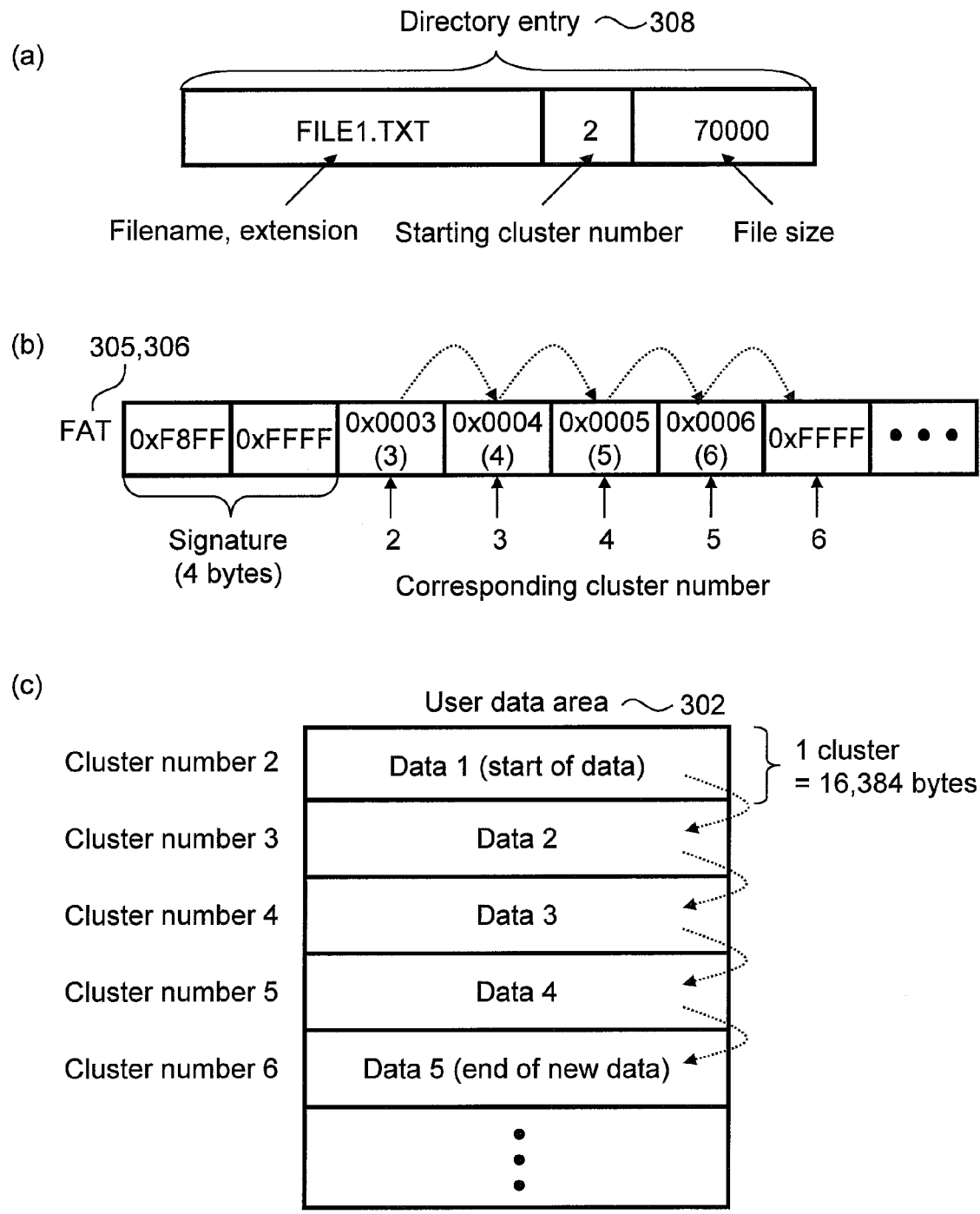
FIG. 6 is an illustrative diagram showing an example of a state after file data writing in the FAT file system.

EXPLANATION OF REFERENCE 1 access module
2 information recording module
11, 212 CPU
12, 213 RAM
13 information recording module interface
14, 214 ROM
21 controller
22 non-volatile memory
101 application control unit
102 file system control unit
103 information recording module access unit
104 page cache information setting unit
211 access module interface
215 non-volatile memory interface
216 address conversion control unit
217 page cache control unit
221 address management information
222 address conversion information
223 free block information
224 page cache information
301 file system management information area
302 user data area
303 MBR partition table
304 partition boot sector
305, 306 FAT
307 root directory entry
308 directory entry

BEST MODE FOR CARRYING OUT THE INVENTION

Below is a description of an access module (access device), an information recording module (information recording device), a controller, and an information recording system of the present invention with reference to the drawings.

Embodiment 1

1: Configuration of Access Module and Information Recording Module

FIG. 1 shows a configuration of an access module and an information recording module according to Embodiment 1 of the present invention.

In FIG. 1, an access module 1 includes a CPU 11, a RAM 12, an information recording module interface 13, and a ROM 14.

A program that controls the access module 1 is stored in the ROM 14, and this program runs on the CPU 11 with use of the RAM 12 as a temporary storage area.

The information recording module interface 13 is a connection unit that connects an information recording module 2 and the access module 1, and transmits and receives control signals and data.

The ROM 14 furthermore includes an application control unit 101, a file system control unit 102, and an information recording module access unit 103.

The application control unit 101 performs overall control of the access module 1, such as control of power supply and data generation.

The file system control unit 102 performs control for managing data as files with use of a file system such as the FAT file system.

The information recording module access unit 103 controls the transmission and reception of commands and data to and from the information recording module 2, such as receiving data as a well as a size and an address from the file system control unit 102, and recording data having a designated size in a designated location in a recording area of the information recording module 2.

The file system control unit 102 furthermore includes a page cache information setting unit 104.

The page cache information setting unit 104 is a control unit that controls access to a page cache, and is a feature of the present invention and does not exist in conventional access modules.

Meanwhile, the information recording module 2 in FIG. 1 includes a controller 21 and a non-volatile memory 22.

The controller 21 is a module that performs overall control of the non-volatile memory 22, and is configured as, for example, a system LSI including a CPU and the like.

The controller 21 furthermore includes an access module interface 211, a CPU 212, a RAM 213, a ROM 214, and a non-volatile memory interface 215.

The access module interface 211 is a connection unit that connects the information recording module 2 and the access module 1, and likewise to the information recording module interface 13, is an interface for transmitting and receiving control signals and data.

A program that controls the information recording module 2 is stored in the ROM 214, and this program runs on the CPU 212 with use of the RAM 213 as a temporary storage area.

The non-volatile memory interface 215 is a connection unit that connects the controller 21 and the non-volatile memory 22, and controls the transmission and reception of commands and data to and from the non-volatile memory 22.

The ROM 214 furthermore includes an address conversion control unit 216 and a page cache control unit 217.

The address conversion control unit 216 is a control unit that controls the association between physical addresses in the non-volatile memory 22 and logical addresses in a logical address space provided by the information recording module 2 as an address space that can be accessed from the access module 1. The address conversion control unit 216 is a control unit similar to the address conversion control unit existing in conventional information recording modules.

The page cache control unit 217 is a control unit that controls a page cache, and is a feature of the present invention and does not exist in conventional information recording modules.

Also, the non-volatile memory 22 stores address management information 221 in an area different from the area in which user data is stored.

The address management information 221 is information used in the management of addresses in the recording area in the non-volatile memory 22, and indicates, for example, the above-described association between physical addresses and logical addresses. For this reason, whereas user data is stored in the logical address space that can be accessed from the access module 1, the address management information 221 is stored outside the logical address space so as to not be accessible from the access module 1 (in an area that cannot be accessed from the access module 1 with use of a logical address).

The address management information 221 furthermore includes address conversion information 222 that manages the association between physical addresses and logical addresses, free block information 223 that manages free physical blocks, and page cache information 224 that manages page caches.

The address conversion information 222 and the free block information 223 are similar to the information included in conventional information recording modules.

On the other hand, the page cache information 224 is information for managing page caches, and is a feature of the present invention and does not exist in conventional information recording modules.

In the information recording module 2 in Embodiment 1 of the present invention, the page cache information 224 is stored in the non-volatile memory 22.

With use of this page cache information 224, the page cache control unit 217 in the information recording module 2 implements processing for writing small-sized data (information) in a specific physical block used as a cache.

Also, the access module 1 in Embodiment 1 of the present invention includes the page cache information setting unit 104 that notifies information to be set in the page cache information 224 to the information recording module 2. The combination of the access module 1 and the information recording module 2 enables executing processing for writing small-sized data (information) in a page cache, thereby increasing the speed of writing processing. Also, due to cutting down needless saving process, it is possible to prevent a decrease in the rewriting lifetime of the non-volatile memory.

2: Configuration of Non-Volatile Memory 22

Figure 8:
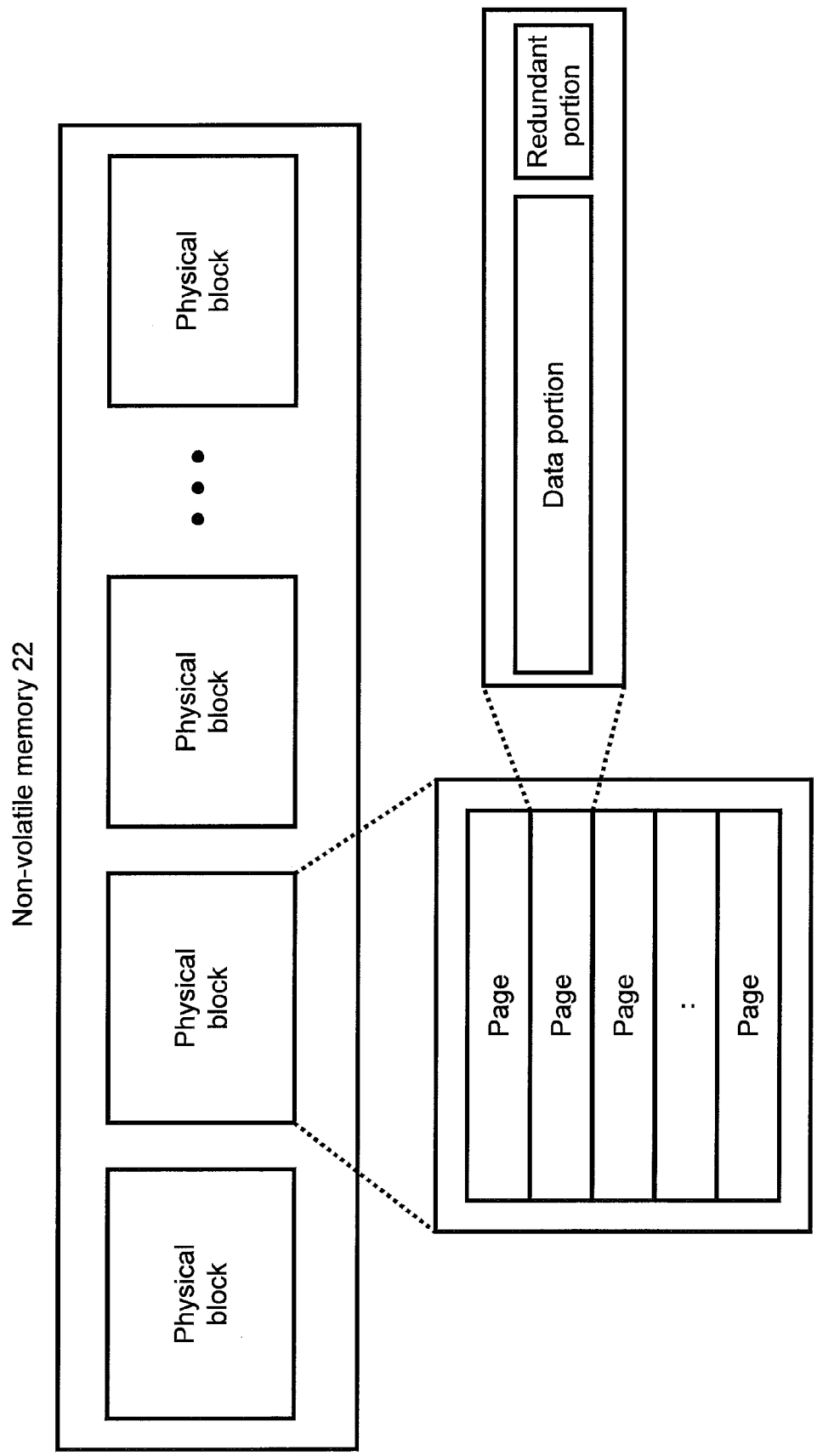
FIG. 8 is an illustrative diagram showing an exemplary configuration of a non-volatile memory according to Embodiment 1 of the present invention.

Next is a description of a configuration of the non-volatile memory 22 in Embodiment 1 of the present invention with reference to FIG. 8.

A NAND-type flash memory, for example, is used as the non-volatile memory 22. The non-volatile memory 22 is configured from multiple physical blocks.

A physical block is a unit according to which data is erased, and data needs to be erased once according to this unit before data is written. Also, each physical block is configured from multiple pages.

A page is a unit according to which data readout and writing are performed. Furthermore, each page includes a data portion and a redundant portion.

The data portion is an area that can be accessed from the access module 1 as a logical address space, and is the area where file data and the like are actually stored.

Also, the redundant portion is an area where ECC and management information regarding the non-volatile memory 22 and the like are stored, and is an area that cannot be accessed from the access module 1. The size of the data portion is, for example, 4 KB, and the size of the redundant portion is approximately 128 bytes.

Also, if focus is placed on only the data portion, the size of each physical block is, for example, approximately 512 KB. Consequently, the non-volatile memory 22 that is configured from 2,048 physical blocks having this size has a total capacity of 1 GB.

3: Data Writing Processing Procedure in Information Recording Module

Next, in order to clarify a feature of the present invention, a description will be given of a comparison between a data writing processing procedure performed in a conventional information recording module, and a data writing processing procedure performed in the information recording module in Embodiment 1 of the present invention.

(3.1: Data Writing Processing Procedure in Conventional Information Recording Module)

Figure 9:
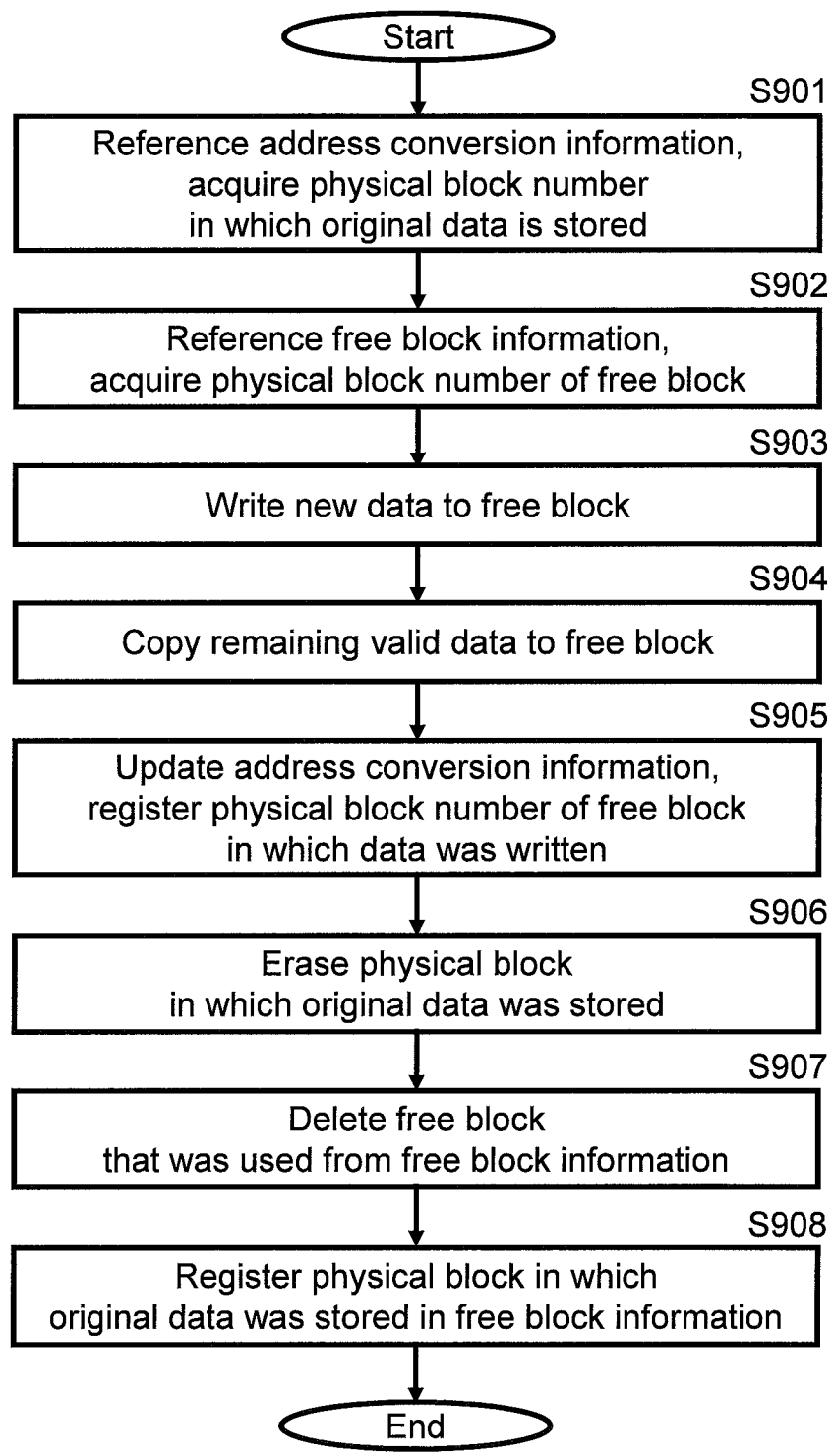
FIG. 9 is a flowchart showing a data writing processing procedure performed in a conventional information recording module.
Figure 10:
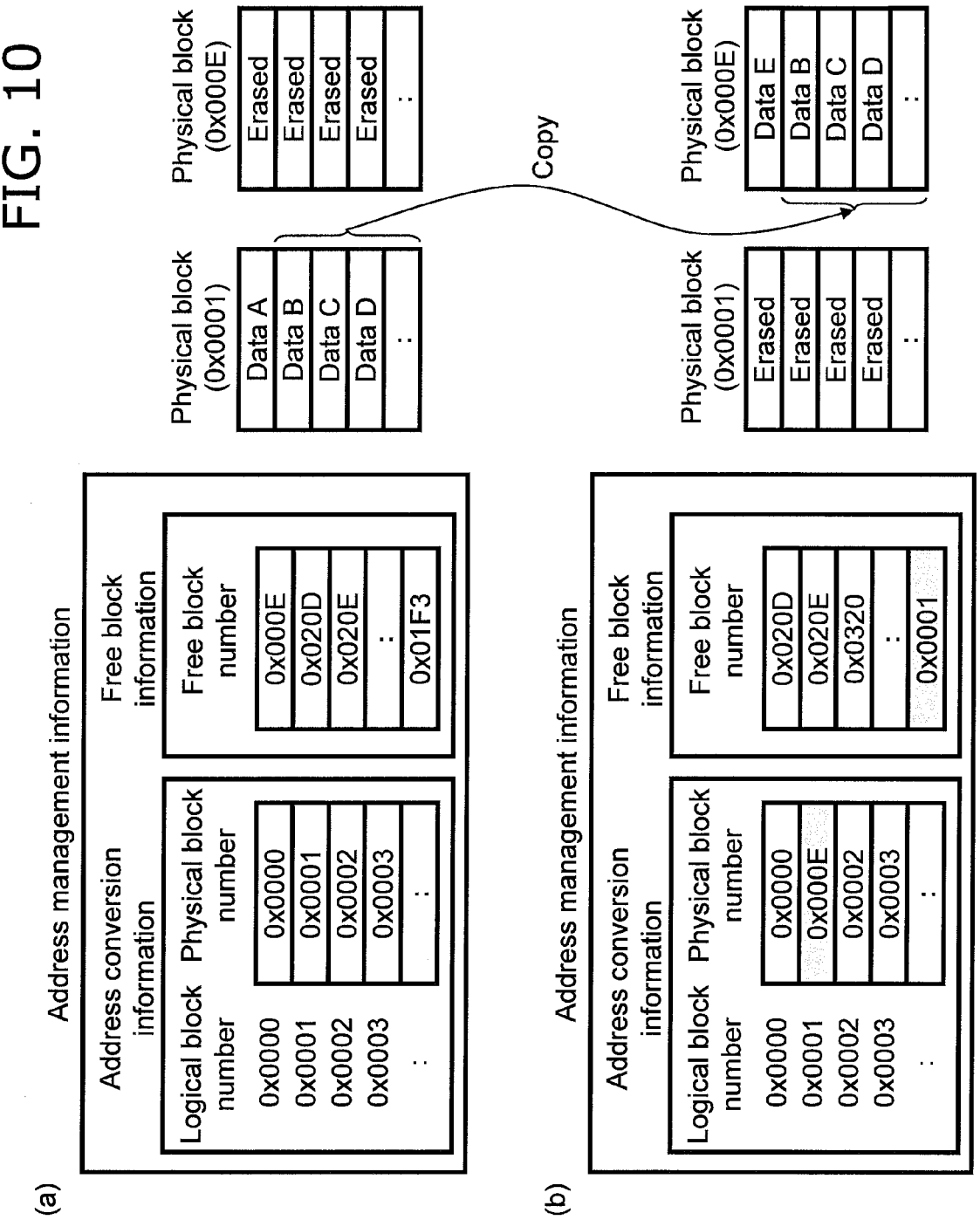
FIG. 10 is an illustrative diagram showing an example of address management information and physical blocks in the conventional information recording module.

First is a description of the data writing processing procedure performed in the conventional information recording module with reference to FIGS. 9 and 10.

FIG. 9 is a flowchart showing a data writing processing procedure performed in the conventional information recording module. Address conversion in this processing is implemented by the address conversion control unit in the information recording module.

FIG. 10 is an illustrative diagram showing an example of address management information and physical blocks in the conventional information recording module. In FIG. 10(a) shows a state before writing, and FIG. 10(b) shows a state after writing. As shown in FIG. 10(a), the address management information in the conventional information recording module includes address conversion information and free block information.

The address conversion information is information that manages the association between logical addresses and physical addresses, and is configured by, for example, a table storing block numbers of physical blocks allocated to logical blocks. Also, the free block information is information that manages the block numbers of free physical blocks that have not been allocated.

The following describes the data writing processing procedure performed in the conventional information recording module with reference to FIG. 9.

(S901): reference the address conversion information, and acquire the block number of the physical block that is the writing target area and in which original data is stored. The example in FIG. 10 envisions the case where "Data A" existing in the first page at logical block number 0x0001 is overwritten with "Data E". In this case, the address conversion information is referenced, and 0x0001 is acquired as the physical block number corresponding to the logical block number 0x0001.

(S902): reference the free block information, and acquire the physical block number of a free block. In the example in FIG. 10(a), the free block information is referenced, and 0x000E is acquired as the first stored value. In other words, the block having the physical block number 0x000E is currently unused and being managed as a free block, and is in a state in which the data in the physical block has been erased.

(S903): write new data in the free block acquired in S902. In the example in FIG. 10, "Data E" is written in the first page of the block having the physical block number 0x000E.

(S904): copy the remaining valid data to the free block. In the example in FIG. 10, due to the fact that the data from data B in the physical block 0x0001 and onward needs to be held as valid data even after writing, all of the data from data B onward is copied to the block having the physical block number 0x000E that is a free block. This processing is generally called "saving process".

(S905): the address conversion information is updated, and the physical block number of the free block to which the data was written is registered. In the example in FIG. 10, although 0x0001 is managed as the physical block corresponding to the logical block number 0x0001, this value changes to 0x000E due to the writing processing that was performed this time, and therefore this location in the address conversion information is rewritten to 0x000E.

(S906): the physical block in which the original data was stored is erased. In the example in FIG. 10, all of the data included in the block having the physical block number 0x0001 is erased.

(S907): the free block that was used is deleted from the free block information. In the example in FIG. 10, the block having the physical block number 0x000E was used, and therefore the number 0x000E is deleted from the free block information.

(S908): the physical block in which the original data was stored is registered in the free block information. In the example in FIG. 10, the number 0x0001 is registered in the free block information so that the block having the physical block number 0x0001 in which the original data was stored is managed as a free block.

According to this series of processing, the address management information changes from the state shown in FIG. 10(a) to the state shown in FIG. 10(b). Although the case of implementing writing processing for one page has been described in this example, in actuality, all of the remaining valid data in the physical block is also written according to the saving process in S904, and therefore writing processing in which one physical block worth of data is written is performed. The frequency with which this saving process is executed decreases as the data size of the writing data increases, and if data is written in units of physical blocks, saving process ceases to be executed. Specifically, assuming the case where the page size is 4 KB and the physical block size is 512 KB, the processing time is substantially the same when writing 4 KB of data and when writing 512 KB of data, and therefore when processing speed is considered, processing when writing data in units of pages is 128 times slower than when writing data in units of physical blocks.

The present invention provides a method that cuts down the decrease in speed that occurs in this way when writing small-sized data, and furthermore prevents a decrease in the rewriting lifetime of the non-volatile memory.

FIG. 11 is an illustrative diagram showing an exemplary configuration of the address management information 221 in the information recording module 2 in Embodiment 1 of the present invention. The address conversion information 222 and the free block information 223 in FIG. 11 are similar to the information in the conventional information recording module. The address management information 221 in Embodiment 1 of the present invention furthermore includes the page cache information 224.

The page cache information 224 stores information necessary when writing small-sized data with use of a specific physical block as a cache. The example in FIG. 11 shows the case where three physical blocks are used as page caches, and the numbers 0x0000, 0x0001, and 0x0002 have been uniquely and respectively allocated to these physical blocks as page cache numbers.

The page cache information 224 includes a physical block number, a logical block number, and a logical page number in correspondence with each page cache number. For example, in the example in FIG. 11, the block having the physical block number 0x03F0 is allocated to the page cache having the page cache number 0x0000, and this represents that this page cache is to be used in the case where reading and writing from/to the logical addresses "logical block number 0x0001" and "logical page number 0x0000" is executed.

(3.2: Data Writing Processing Procedure in Information Recording Module 2)

Next is a description of the data writing processing procedure performed in the information recording module 2 in Embodiment 1 of the present invention with reference to FIGS. 11 to 15.

FIG. 11 shows an example of the state of the address management information 221 before data writing, and FIG. 14 shows an example of the state of the address management information 221 after data writing.

Figure 12:
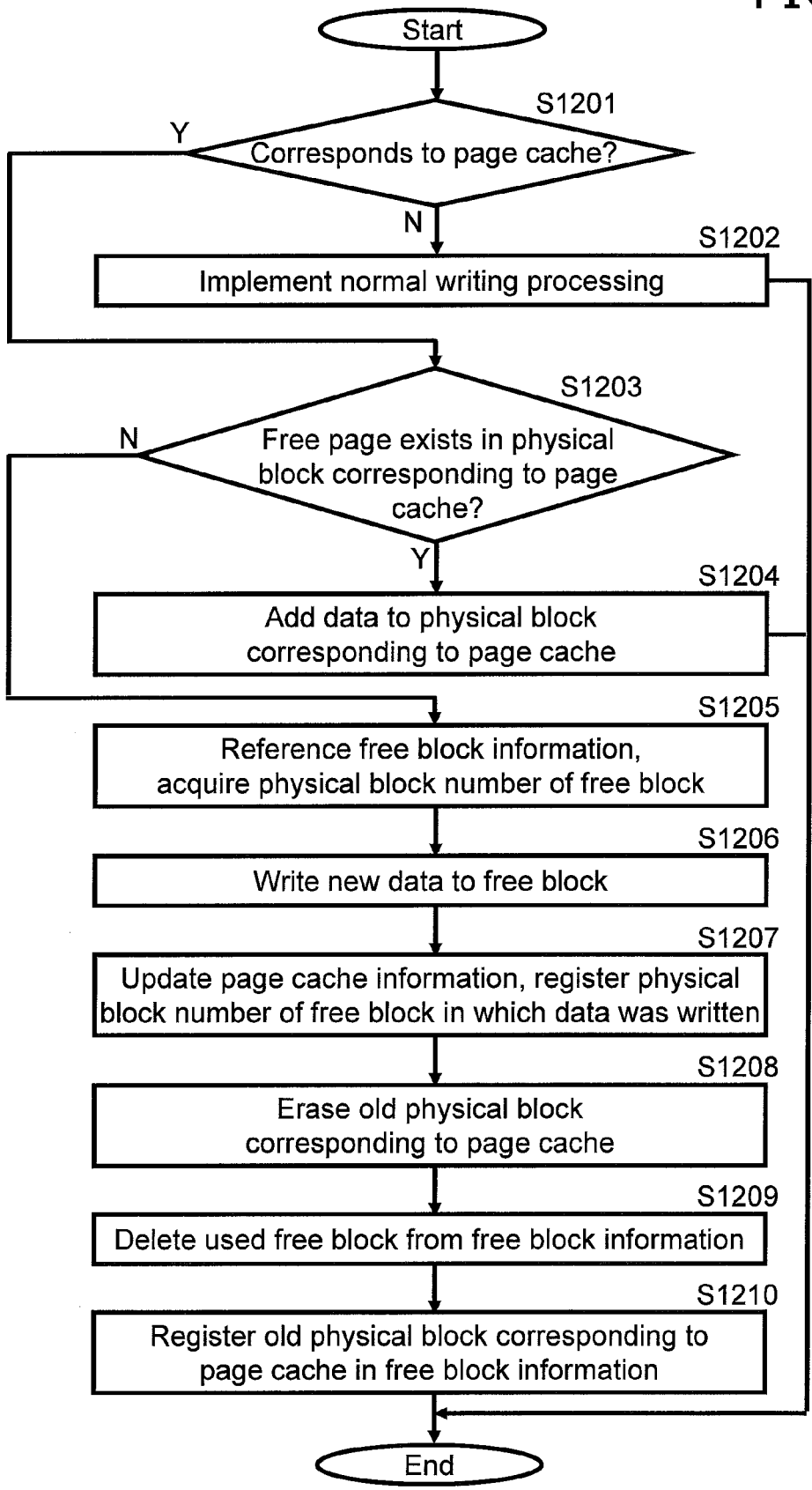
FIG. 12 is a flowchart showing a data writing processing procedure according to Embodiment 1 of the present invention.

FIG. 12 shows the data writing processing procedure.

Figure 13:
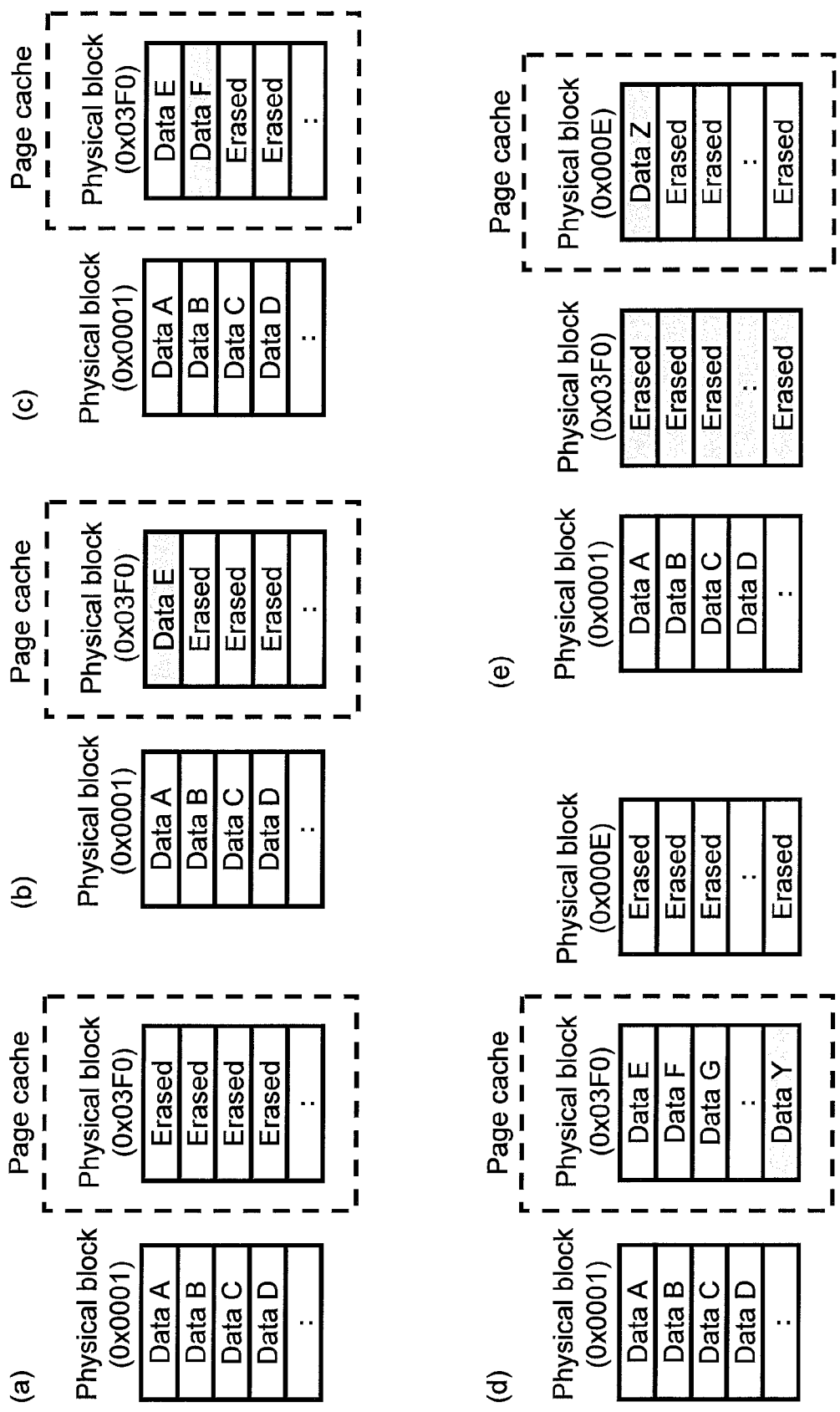
FIG. 13 is an illustrative diagram showing an example of a state of physical blocks during data writing according to Embodiment 1 of the present invention.

FIG. 13 shows the state of physical blocks in which original data is stored and physical blocks that have been allocated to page caches, during data writing.

Figure 15:
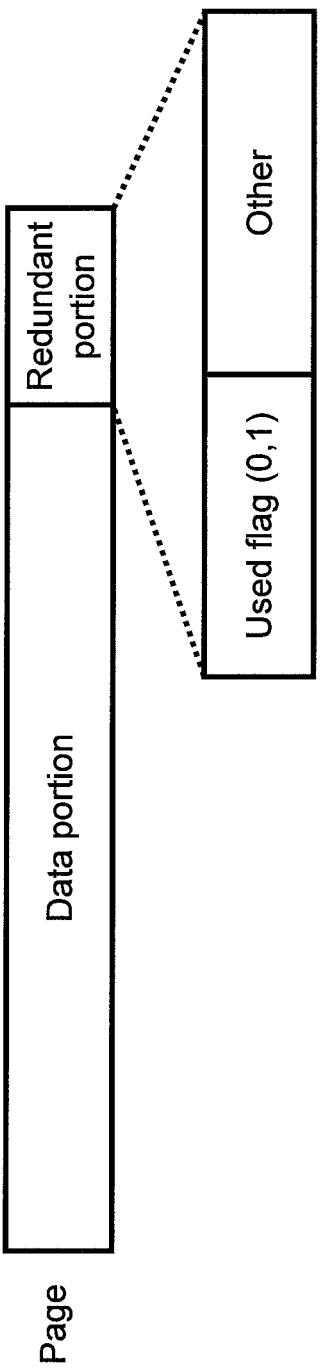
FIG. 15 is an illustrative diagram showing an example of a state of a page according to Embodiment 1 of the present invention.

FIG. 15 shows an example of the state of a page in a physical block that has been allocated to a page cache.

These examples envision the case where "Data A" in the first page (logical page number: 0x0000) of the logical block having the logical block number 0x0001 is sequentially overwritten with "Data E", "Data F", . . . , and "Data Z".

The following describes the data writing processing procedure performed in the information recording module 2 in Embodiment 1 of the present invention with reference to FIG. 12.

(S1201): reference the page cache information 224 and check whether the writing target area corresponds to a page cache. In the case of corresponding, the procedure proceeds to the processing of S1203, and in the case of not corresponding, the procedure proceeds to the processing of S1202.

In the example in FIG. 11, in the case where the writing target area is the first page (logical page number 0x0000) of the logical block having the logical block number 0x0001, the writing target area corresponds to the logical block number and logical page number that correspond to the page cache number 0x0000, and therefore a determination is made that the writing target area corresponds to the page cache having the page cache number 0x0000.

(S1202): if a determination has been made in S1201 that the writing target area "does not correspond" to a page cache, normal writing processing in which a page cache is not used is implemented, and the processing ends. Specifically, processing similar to the writing processing illustrated in the flow in FIG. 9 is implemented. In this case, writing cannot be performed at high speed even if processing for writing small-sized data (information) is implemented. However, in Embodiment 1 of the present invention, the case is envisioned in which processing for writing small-sized data (information) makes use of a page cache, and large-sized data such as file data is written in units of physical blocks without use of a page cache. In this way, using a page cache in processing for writing small-sized data (information) enables improving the speed of writing processing. For example, in the case of writing real-time data such as a video in the information recording module 2, the high-volume stream data and the low-volume file system management information are recorded alternately in the information recording module 2, and since the processing for writing the low-volume file system management information (one example of small-sized data (information)) is performed with use of a page cache in the information recording module 2, it is possible to suppress the execution of saving process. This enables improving the speed of data writing processing performed in the information recording module 2.

(S1203): if a determination has been made in S1201 that the writing target area "corresponds" to a page cache, it is checked whether a free page exists in the physical block corresponding to the page cache. If a free page exists, the procedure proceeds to the processing of S1204, and if a free page does not exist, the procedure proceeds to the processing of S1205.

One example of a method for checking whether a free page exists is a method of, as shown in FIG. 15, storing a flag (Used flag) in the redundant portion of each page that indicates whether the page is being used. The Used flag is, for example, a 1-bit flag that is set to "1" if the page is a free page, and set to "0" if data has been written to the page. By setting the Used flag of all pages to "1" as the initial value, and writing "0" in the Used flag in the redundant portion when writing data to the data portion of a page, it is possible to determine which pages are free pages.

(S1204): if a determination has been made in S1203 that a free page exists in the physical block corresponding to the page cache, new data is written to the free page, and the processing ends. In the state in FIG. 13(*a*), all of the pages in the block having the physical block number 0x03F0 that has been allocated to a page cache have been erased, and are being managed as free pages. For this reason, "Data E" with which the logical page number 0x0000 in the logical block number 0x0001 is to be overwritten is written to the first page in the physical block number 0x03F0 that is the page cache, thus resulting in the state in FIG. 13(*b*). Similarly, in the case where the same address (same logical address) is sequentially overwritten with "Data F", "Data G", . . . , and "Data Y", the resulting states are as shown in FIG. 13(*c*) and FIG. 13(*d*).

(S1205): if a determination has been made in S1203 that a free page does not exist in the physical block corresponding to the page cache, the free block information 223 is referenced, and the physical block number of a free block is acquired. In the example in FIG. 11, the free block information 223 is referenced, and 0x000E that is the first stored value is acquired. In other words, the block having the physical block number 0x000E is currently unused and being managed as a free block, and is in a state in which the data in the physical block has been erased.

(S1206): write new data in the free block acquired in S1205. In the example in FIG. 13(*e*), "Data Z" is written in the first page of the block having the physical block number 0x000E.

(S1207): update the page cache information 224, and register the physical block number of the free block to which data was written. In the example in FIG. 11, although 0x03F0 was managed as the physical block corresponding to the page cache number 0x0000, this value changes to 0x000E due to the writing processing that was performed this time, and therefore this location in the page cache information 224 is rewritten to 0x000E.

(S1208): the old physical block that was previously used as a page cache is erased. In the example in FIG. 13(*e*), all of the data included in the block having the physical block number 0x03F0 is erased.

(S1209): the free block that was used is deleted from the free block information 223. In the example in FIG. 14, the block having the physical block number 0x000E was used, and therefore the number 0x000E is deleted from the free block information 223.

(S1210): the old physical block that was used as a page cache is registered in the free block information 223, and the processing ends. In the example in FIG. 14, the number 0x03F0 is registered in the free block information 223 so that the block having the physical block number 0x03F0 that was used as a page cache is managed as a free block.

According to this series of processing, the address management information 221 changes from the state in FIG. 11 to the state in FIG. 14. The biggest difference between the conventional writing processing procedure in FIG. 9 and the writing processing procedure in Embodiment 1 of the present invention in FIG. 12 is that the saving process of S904 is not executed in Embodiment 1 of the present invention. With Embodiment 1 of the present invention, the execution of saving process is prevented by making use of page caches, thus enabling improving the speed of processing for writing small-sized data (information).

4: Data Readout Processing Procedure

Figure 16:
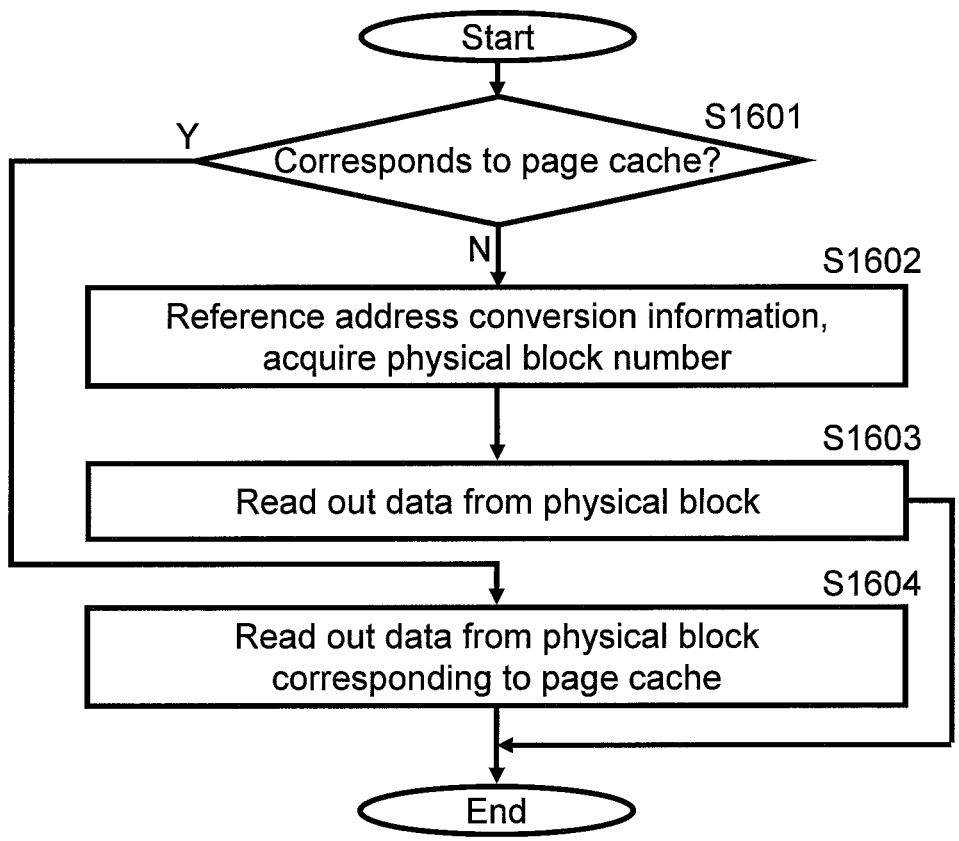
FIG. 16 is a flowchart showing a data readout processing procedure according to Embodiment 1 of the present invention.

Next is a description of a data readout processing procedure performed in the information recording module 2 in Embodiment 1 of the present invention with reference to FIG. 16.

(S1601): reference the page cache information 224 and check whether a readout target area corresponds to a page cache. In the case of corresponding, the procedure proceeds to the processing of S1604, and in the case of not corresponding, the procedure proceeds to the processing of S1602.

(S1602): if a determination has been made in S1601 that the readout target area "does not correspond" to a page cache, the address conversion information 222 is referenced, and the physical block number of the block storing data that is the readout target area is acquired.

(S1603) data is read out from the block having the physical block number acquired in S1602, and the processing ends.

(S1604): if a determination has been made in S1601 that the readout target area "corresponds" to a page cache, data is read out from the physical block allocated to the page cache, and the processing ends.

In Embodiment 1 of the present invention, since management is performed with use of page caches, as for logical address areas allocated to page caches, it is possible for data to exist in both the physical block areas managed by the address conversion information 222 and the physical block areas managed by the page cache information 224. It is therefore necessary to determine either of the data to be valid data, and in Embodiment 1 of the present invention, valid data is uniquely specified by always determining data stored in a page cache to be valid data.

5: Page Cache Information Setting Unit 104

Next is a description of the page cache information setting unit 104 in the access module 1 in Embodiment 1 of the present invention.

The page cache information setting unit 104 in the access module 1 realizes the functions of setting and canceling information regarding a page cache in the information recording module 2. As was described with reference to FIG. 7, in the case of writing data in the order of DATA, DIR, FAT1, and FAT2, page caches are made use of in the DIR writing processing, the FAT1 writing processing, and the FAT2 writing processing that are processing for writing small-sized data (information).

In the case of making use of page caches, before writing processing is performed, the page cache information setting unit 104 in the access module 1 preliminarily issues, to the information recording module 2, a command for setting the page cache information 224.

The format of the setting command is, for example SetPageCacheInfo (PageCacheNum, LogicalBlockNum, LogicalPageNum).

"PageCacheNum" represents the page cache number targeted for information setting, and in the exemplary case where three page caches exist as shown in FIG. 11, either 0x0000, 0x0001, or 0x0002 is set as the value.

"LogicalBlockNum" and "LogicalPageNum" represent logical addresses targeted to be a page cache, and, for example, in the example of the page cache number 0x0000 in FIG. 11, the following setting is performed.

0x0001 is set as "LogicalBlockNum"
0x0000 is set as "LogicalPageNum"

In this way, the page cache number that is the setting target and the logical address of the target area are set according to the command for setting the page cache information 224.

Accordingly, this target area is set as the area to be the page cache. Then after this setting has been performed, in the case where the readout/writing command issued to the information recording module 2 by the access module 1 is a command for accessing the area set as the page cache target area, the page cache is made use of in the readout/writing processing that is performed according to the command.

Figure 7:
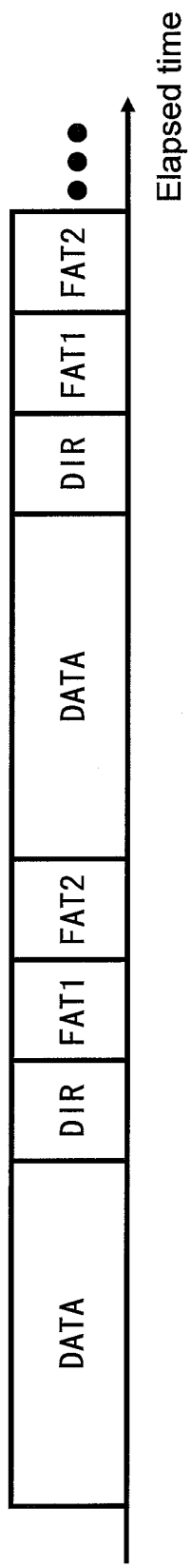
FIG. 7 is an illustrative diagram showing an example of an access sequence performed at the time of file updating in the FAT file system.

In the example of FIG. 11, since three page caches exist, areas for the DIR, FAT1, and FAT2 are registered as page cache areas in advance, and therefore in the case where access is performed as shown in FIG. 7, the DIR, the FAT1, and the FAT2 are written at high speed with use of the page caches, thus enabling increasing the speed of the series of file data writing processing.

Also, the processing for changing a logical address set as a page cache target area can be implemented by the access module 1 again issuing a SetPageCacheInfo command to the information recording module. Specifically, the page cache target area can be changed by issuing a SetPageCacheInfo command in which the same page cache number as before is set as the PageCacheNum, and different logical addresses from before are set as the LogicalBlockNum and the LogicalPageNum.

In this case, data corresponding to the logical address that was previously set as the page cache area needs to be moved outside the page cache.

This move processing can be realized by a procedure similar to the conventional data writing processing procedure illustrated in FIG. 9. Specifically, the free block information 223 is referenced, a free block is acquired, the information stored in the physical block managed by the address conversion information 222 and the information stored in the physical block managed by the page cache information 224 is combined and written to the free block, and the address conversion information 222, the free block information 223, and the page cache information 224 are updated so that the area that was written to is managed by the address conversion information 222.

According to this processing, data corresponding to a logical address that was previously set as a page cache area is moved to an area managed by the address conversion information 222, thereby enabling the page cache to be used for a different logical address.

As described above, writing processing can be implemented at high speed by using a combination of the access module 1 and information recording module 2 in Embodiment 1 of the present invention, managing processing for writing small-sized data (information) by a page cache, and preventing the execution of needless saving process.

In this way, the access module 1 and information recording module 2 of the present embodiment enable preventing the execution of needless saving process, thereby cutting down the number of times that processing for writing data to the non-volatile memory 22 is performed. As a result, it is possible to prevent a decrease in the rewriting lifetime of the non-volatile memory 22.

Furthermore, with the method of management using a page cache in Embodiment 1 of the present invention, in the case where the access module 1 has implemented processing for writing one page of data to the information recording module 2, the amount of data that is written to the non-volatile memory 22 is always one page.

For this reason, in a case such as when recording video in real-time by a video camera or the like, a time (period) occurs in which the processing speed becomes, for example, 128 times slower when updating the DIR, the FAT1, and the FAT2 in the conventional writing processing procedure if saving process is executed (assuming the case where the page size is 4 KB and the physical block size is 512 KB, the processing time is substantially the same when writing 4 KB of data and when writing 512 KB of data, and therefore when processing speed is considered, processing when writing data in units of pages is 128 times (=512/4) slower than when writing data in units of physical blocks). Real-time recording has therefore not been able to be performed stably.

In contrast, with the present invention, processing is always performed in a certain short time period when updating the DIR, the FAT1, and the FAT2 (the execution of saving process can be suppressed, thereby enabling fixing a minimum processing time in processing for updating the DIR, the FAT1, and the FAT), thus enabling stably implementing real-time recording.

Note that although the present invention has been described based on the above embodiment, the present invention is of course not limited to the above embodiment. Modifications can be made without departing from the spirit of the present invention. The numerical values described in this embodiment of the present invention are exemplary, and other values may be used. For example, values such as the physical block size and page size are all exemplary, and are not limited to the values described in Embodiment 1 of the present invention.

Also, although the configuration of the controller 21 of the information recording module 2 has been described using the illustration in FIG. 1, the controller 21 may have another configuration. For example, the CPU 212, the RAM 213, and the like in the controller 21 may be disposed outside the controller 21, or conversely, other constituent elements may be included in the controller 21.

Also, although FAT16 has been described as an example of the file system in this embodiment of the present invention, another file system may be used.

Also, although a description has been given of the example in which the address management information 221 stored in the non-volatile memory 22 of the information recording module 2 is configured from the address conversion information 222, the free block information 223, and the page cache information 224, this configuration is exemplary, and another configuration may be implemented as long as similar address management can be realized. For example, a configuration may be implemented in which rather than the address conversion information 222 being realized as a unified management table, such information is stored in the state of being distributed in the redundant portions of pages. Alternatively, a configuration may be implemented in which the address conversion information and the free block information are managed in a unified manner by a single table.

Also, there is no need for the number of non-volatile memories 22 used in the information recording module 2 to be one. Multiple non-volatile memories 22 may be used in combination. In particular, it is possible to further increase the speed of writing processing in the case of a configuration in which data can be written to multiple non-volatile memories 22 in parallel.

Also, in order to effectively use page caches in this embodiment of the present invention, the writing size needs to be appropriately set in conformity with the unit of page cache management. For this reason, it is furthermore effective to provide a command via which information such as the page size, the physical block size, and the number of page caches can be exchanged between the access module 1 and the information recording module 2.

Also, a description of the case where new data is added in units of pages to a physical block used as a page cache has been given in this embodiment of the present invention. For this reason, the most recent valid data among the data stored in a page cache is always the tail data stored in a physical block, and therefore can be uniquely specified. This method is exemplary, and the present invention is not limited to this method. For example, data may be written to an arbitrary page in a physical block used as a page cache, and the page storing the newest valid data may be specified by storing a flag, sequence number, or the like indicating that the data is the most recent data in the redundancy area.

Also, the format of the SetPageCacheInfo command described in the present embodiment is exemplary, and another information format may be used as long as similar information can be set as the information that is set as the arguments of the command. Although the use of page cache numbers has been described for the sake of illustration in the present embodiment, there is no limitation to this. Page cache numbers do not necessarily need to be used as long as a method of identifying data targeted for page caching by logical addresses is used.

Also, although a method of managing page cache information with use of page cache numbers, physical block numbers, logical block numbers, and logical page numbers has been described for the sake of illustration in the present embodiment, in this case as well, page cache numbers do not necessarily need to be used as long as page caches can be identified from logical addresses (logical block numbers and logical page numbers).

Also, although a description has been given in this embodiment of the present invention using the example of file system management information such as the DIR, the FAT1, and the FAT2 as the small-sized data (information) that is written, applying the present invention can increase the speed of processing for writing other data as well, as long as the data is small-sized data. For example, page caches may be used in the case of writing small-sized file data such as text data, and even in the case where recording areas are not managed by a file system, page caches may be used in the writing of small-sized data (information).

Embodiment 2

Next is a description of another embodiment of the present invention.

An access module and an information recording module in Embodiment 2 of the present invention have the same configurations as those illustrated in FIG. 1.

Embodiment 2 of the present invention differs from Embodiment 1 of the present invention in that, whereas three physical block were allocated and managed as page caches in Embodiment 1, only one physical block is allocated and managed as page caches in the present embodiment. For this reason, whereas the address management information 221 has the configuration shown in FIG. 11 in Embodiment 1 of the present invention, the configuration of the address management information 221 in the present embodiment has been changed to the configuration shown in FIG. 17.

Figure 17:
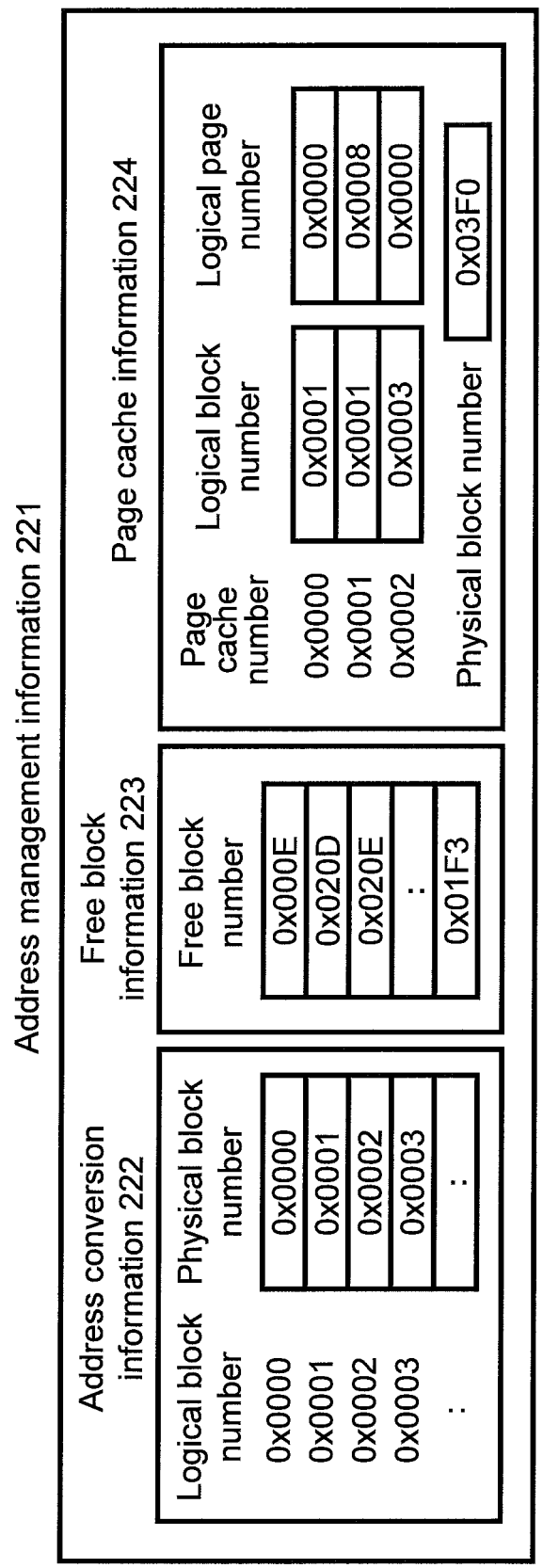
FIG. 17 is an illustrative diagram showing an example of address management information before data writing according to Embodiment 2 of the present invention.

Specifically, the difference between the address management information 221 (Embodiment 2) shown in FIG. 17 and the address management information 221 (Embodiment 1) shown in FIG. 11 is that number of physical block numbers stored in the page cache information 224 has been reduced from three to one. In other words, the present embodiment enables reducing the number of physical blocks that are actually allocated to page caches.

Next is a description of the data writing processing procedure performed in the information recording module 2 in Embodiment 2 of the present invention with reference to FIGS. 17 to 21.

FIG. 17 shows an example of the state of the address management information 221 before data writing, and FIG. 20 shows an example of the state of the address management information 221 after data writing.

Figure 18:
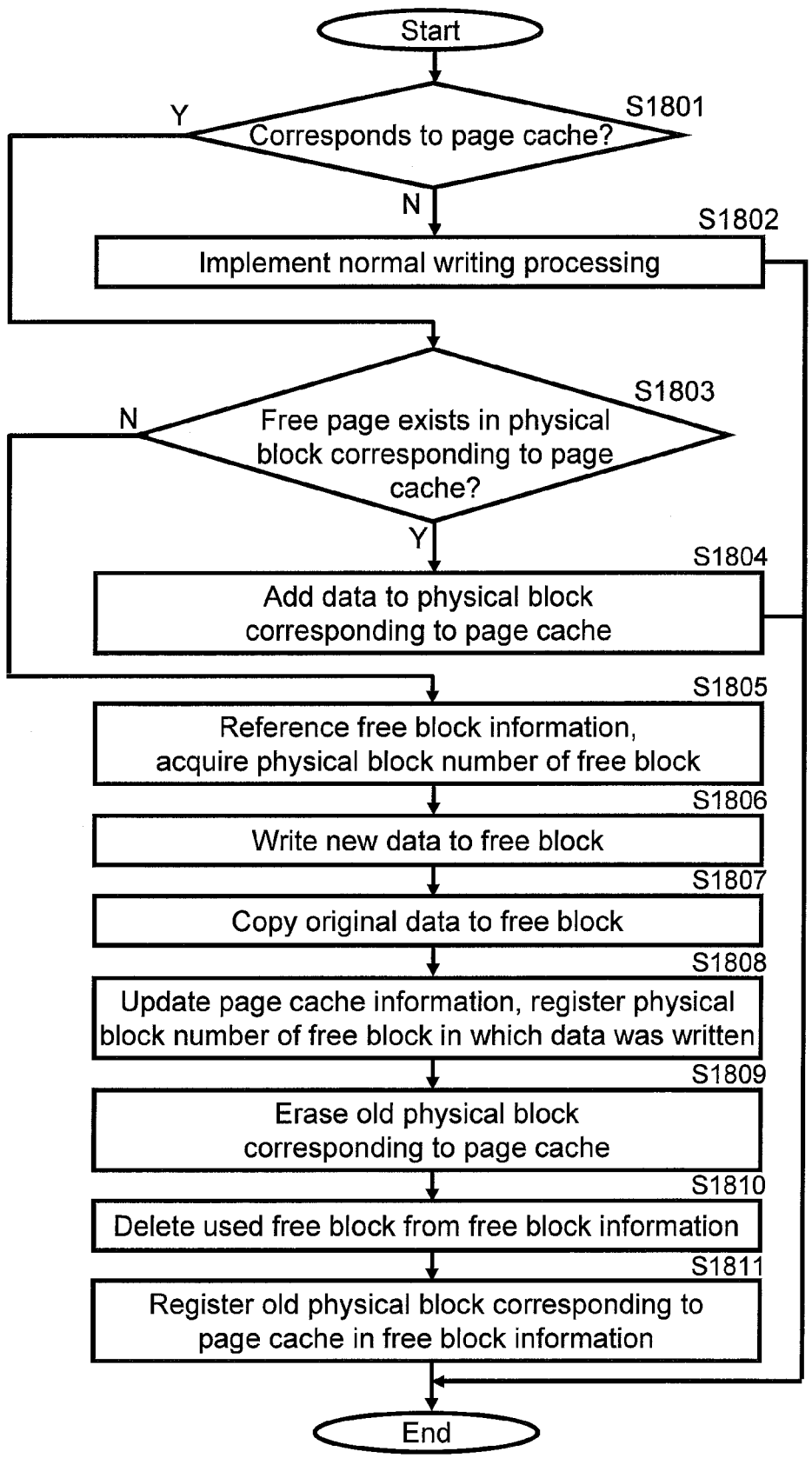
FIG. 18 is a flowchart showing a data writing processing procedure according to Embodiment 2 of the present invention.

FIG. 18 shows the data writing processing procedure.

Figure 19:
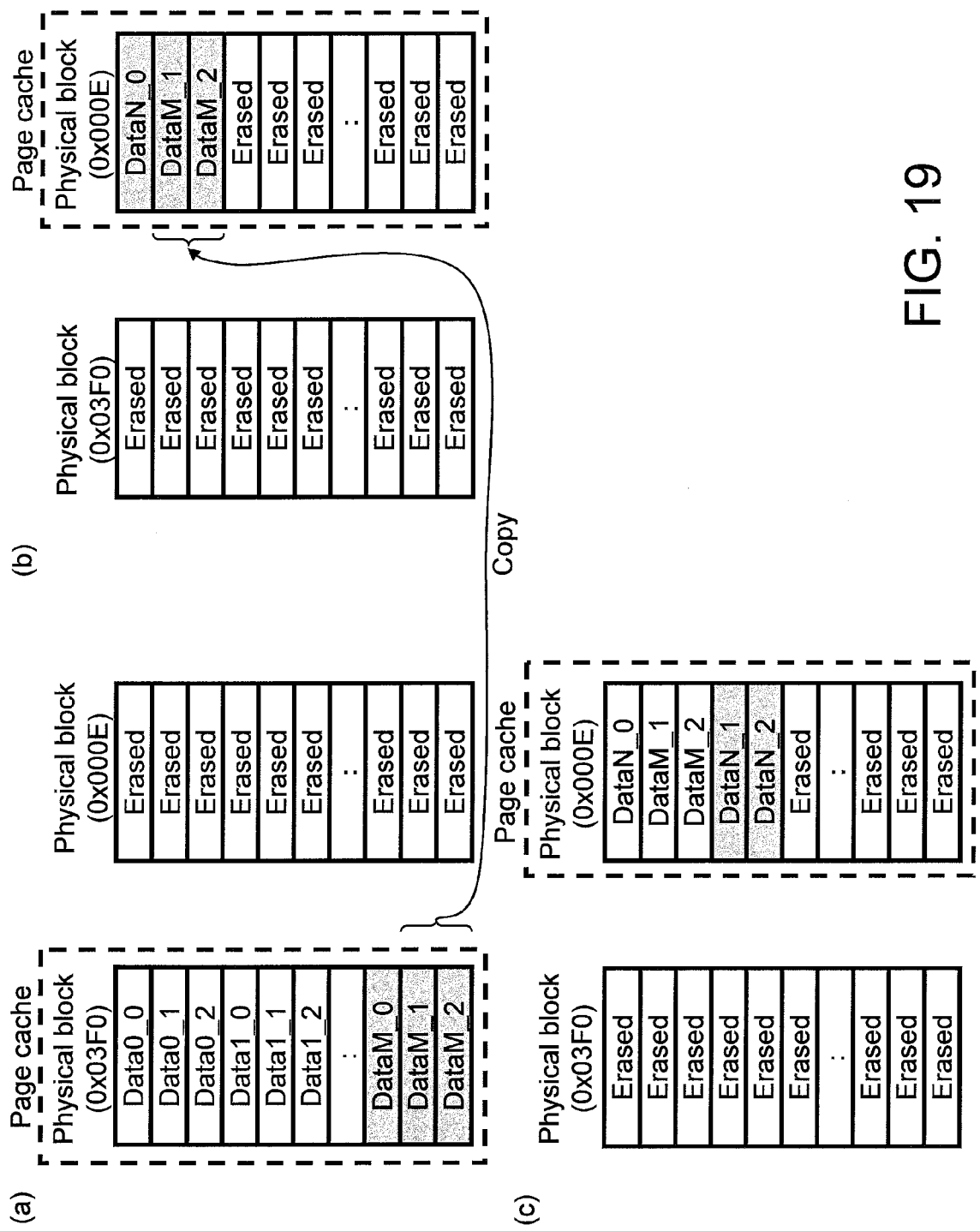
FIG. 19 is an illustrative diagram showing an example of a state of a physical block during data writing according to Embodiment 2 of the present invention.

FIG. 19 shows the state of a physical block that has been allocated to page caches and a free block that will be allocated as page caches next, during data writing.

Figure 21:
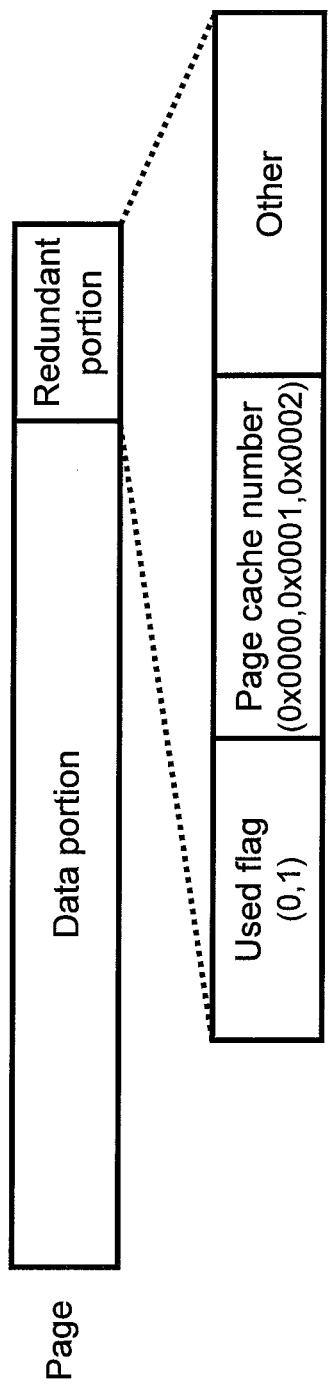
FIG. 21 is an illustrative diagram showing an example of a state of a page according to Embodiment 2 of the present invention.

FIG. 21 shows an example of the state of a page in a physical block that has been allocated to a page cache.

These examples envision the case of sequentially overwriting three page caches.

The data writing processing procedure shown in FIG. 18 differs from the data writing processing procedure shown in FIG. 12 in that the copy processing of S1807 has been added in the data writing processing procedure shown in FIG. 18.

In the page cache management in Embodiment 2 of the present invention, the data in three page caches is stored in one physical block, and therefore three pages worth of valid data is stored in this physical block.

FIG. 19 is an illustrative diagram showing a state after data has been repeatedly added to page caches.

In the example in FIG. 19(a):

"Data M_0" represents the most recent valid data in page cache number 0x0000,

"Data M_1" represents the most recent valid data in page cache number 0x0001, and "Data M_2" represents the most recent valid data in page cache number 0x0002.

Here, in the case where "Data N_0" has been written to page cache number 0x0000, "Data N_0" is written at the head of the free block having the physical block number 0x000E. At this time, although "Data M_0" is old data ("Data M_0" is the data that exists before being updated by "Data N_0", that is to say, is unnecessary data) and therefore may be erased, "Data M_1" and "Data M_2" cannot be erased, due to being valid data in other page caches.

For this reason, "Data M_1" and "Data M_2" are copied to the block having the physical block number 0x000E in which "Data N_0" was written, thus resulting in the state shown in FIG. 19(b).

Thereafter, the "Data N_1" and "Data N_2" data are written to page caches, thus resulting in the state in FIG. 19(c).

Also, the address management information 221 for this state is in the state shown in FIG. 20.

Furthermore, the information stored in the redundant portion of the page illustrated in FIG. 15 is as shown in FIG. 21 in Embodiment 2 of the present invention. The page shown in FIG. 21 differs from the page shown in FIG. 15 in that page cache numbers have been added in the page shown in FIG. 21. In Embodiment 2 of the present invention, one physical block allocated to page caching is shared among multiple page caches, and therefore the page cache numbers that correspond to the pages need to be held. A field for storing page cache numbers is therefore provided in the redundant portion and used in the identification of corresponding page caches.

As described above, in the information recording module 2 in Embodiment 2 of the present invention, one physical block is shared among multiple page caches.

Accordingly, when writing small-sized data (information), the copy processing illustrated in S1807 (in the above example, processing for copying three pages worth of data) is necessary to a small extent, but since it is possible to use one physical block as multiple page caches, more physical blocks can be allocated to the logical address space, thereby enabling raising the area usage efficiency.

Note that although the present invention has been described based on the above embodiment, the present invention is of course not limited to the above embodiment. Modifications can be made without departing from the spirit of the present invention. For example, the various exemplary modifications described in Embodiment 1 of the present invention may be applied to Embodiment 2 of the present invention.

Other Embodiments

Note that the blocks in the access module (access device), the information recording module (information recording device), the controller, and the information recording system described in the above embodiments may individually be configured as a single chip by a semiconductor device such as an LSI, and a configuration is possible in which a portion or all of the blocks are configured as a single chip.

Note that the LSI described here may also be referred to as an IC, a system LSI, a super LSI, or an ultra LSI, depending on the degree of integration.

Also, the technique for integration is not limited to LSI, but instead may be realized by a dedicated circuit or a general-purpose processor. An FPGA (Field Programmable Gate Array) that is programmable after LSI manufacture or a reconfigurable processor in which the connection and settings of circuit cells in the LSI can be restructured may be used.

Furthermore, if integration technology is developed that replaces LSIs due to progressive or derivative semiconductor technology, integration of functional blocks using this technology is of course possible. For example, the application of biotechnology is a possibility.

Also, the various processing in the above embodiments may be realized by hardware, or may be realized by software. Furthermore, such processing may be realized by a combination of software and hardware. Note that in the case where the access module (access device), the information recording module (information recording device), the controller, and the information recording system according to the above embodiments are realized by hardware, it goes without saying that timing adjustment for performing the various processing needs to be performed. For the sake of convenience in the description, details of the timing adjustment performed for various types of signals in actual hardware designing have been omitted from the above embodiments.

Note that specific configurations of the present invention are not limited to the above-described embodiments, and various modifications and corrections can be made without departing from the spirit of the invention.

INDUSTRIAL APPLICABILITY

The access module 1 according to the present invention includes the page cache information setting unit 104 that has the function of setting information necessary for the control of page caches. Also, the information recording module 2 of the present invention includes the page cache control unit 217 that has the functions of storing the page cache information 224 in the non-volatile memory 22 and using a specific physical block as a cache based on such information. The combination of the access module 1 and the information recording module 2 enables using page caches when writing small-sized data, and implementing writing processing at high speed. Also, preventing the execution of needless saving process through page caching enables preventing a decrease in the rewriting lifetime of the non-volatile memory 22. Furthermore, since processing for writing small-sized data can always be performed at high speed, real-time recording can be implemented stably.

This access module 1 is most suitable in devices that handle digital content such as music, still images, and videos, particularly in devices in which content data needs to be recorded in an information recording module in real-time, and this access module 1 can be used in a PC application, an audio recorder, a DVD recorder, an HDD recorder, a video camera, a digital still camera, a mobile phone terminal, and the like.

Also, the information recording module 2 of the present invention can be used as, for example, a removable medium such as a memory card that stores the above digital content and the like, or an internal recording device.

The invention claimed is:

1. An access device that accesses an information recording device including a non-volatile memory formed by a plurality of uniform physical blocks to which data is to be written, the plurality of uniform physical blocks including one specific physical block, the access device comprising:
a page cache information setting unit that notifies the information recording device of two or more specific logical addresses allocated to the one specific physical block, said notification occurring prior to execution of processing for writing data to the non-volatile memory,
wherein when the data is written to the non-volatile memory, the one specific physical block temporarily holds the data,
when the information recording device writes updated data for one of the two or more specific logical addresses, if the one specific physical block has no free area, the information recording device obtains a new physical block,
after writing the updated data to the new physical block from a head of the new physical block, the information recording device subsequently writes data for any other one of the two or more specific logical addresses to the new physical block.

2. The access device according to claim 1, wherein each of the two or more specific logical address is an address indicating an area in which file system management information is stored.

3. The access device according to claim 1, wherein
the information recording device is configured to:
determine whether a target area to which the data is written corresponds to any one of the two or more specific logical addresses,
if the target area corresponds to any one of the two or more specific logical addresses, write the data to the one specific physical block, and
if the target area does not correspond to any one of the two or more specific logical addresses, write the data to a physical block other than the one specific physical block.

4. The access device according to claim 1, wherein each of the two or more specific logical addresses is an address indicating an area in which a directory entry is stored.

5. An information recording device comprising:
a non-volatile memory formed by a plurality of uniform physical blocks to which data is to be written, the plurality of uniform physical blocks including one specific physical block;
a page cache control unit that, based on page cache information including information that allocates two or more specific logical addresses to the one specific physical block, manages the one specific physical block, the one specific physical block temporarily holding data to be recorded by the two or more specific logical addresses; and
a memory control unit that records the page cache information to the non-volatile memory, wherein:
when the information recording device writes updated data for one of the two or more specific logical addresses, if the one specific physical block has no free area, the information recording device obtains a new physical block,
after writing the updated data to the new physical block from a head of the new physical block, the information recording device subsequently writes data for any other one of the two or more specific logical addresses to the new physical block.

6. The information recording device according to claim 5, further comprising:
an interface unit that receives the information regarding the two or more specific logical addresses from an external access device,
wherein the page cache information includes information that allocates the two or more specific logical addresses received by the interface unit to the one specific physical block.

7. The information recording device according to claim 5, wherein in the management of the one specific physical block, the page cache control unit allocates the two or more specific logical addresses to the one specific physical block,
wherein when data is written to the non-volatile memory, the one specific physical block temporarily holds the data.

8. The information recording device according to claim 5, wherein each of the two or more specific logical addresses is an address indicating an area in which file system management information is stored.

9. The information recording device according to claim 5, wherein
the page cache control unit is configured to:
determine whether a target area to which the data is written corresponds to any one of the two or more specific logical addresses,
if the target area corresponds to any one of the two or more specific logical addresses, write the data to the one specific physical block, and
if the target area does not correspond to any one of the two or more specific logical addresses, write the data to a physical block other than the one specific physical block.

10. The information recording device according to claim 5, wherein each of the two or more specific logical addresses is an address indicating an area in which a directory entry is stored.

11. A controller that controls an information recording device provided with a non-volatile memory formed by a plurality of uniform physical blocks to which data is to be written, the plurality of uniform physical blocks including one specific physical block, the controller comprising:
a page cache control unit that, based on page cache information including information that allocates two or more specific logical addresses to the one specific physical block, manages the one specific physical block, the one specific physical block temporarily holding data to be recorded by the two or more specific logical addresses; and
a memory control unit that records the page cache information to the non-volatile memory, wherein:
when the information recording device writes updated data for one of the two or more specific logical addresses, if the one specific physical block has no free area, the information recording device obtains a new physical block,
after writing the updated data to the new physical block from a head of the new physical block, the information recording device subsequently writes data for any other one of the two or more specific logical addresses to the new physical block.

12. The controller according to claim 11, further comprising:
an interface unit that receives the information regarding the two or more specific logical addresses from an external access device, wherein the page cache information includes information that allocates the two or more specific logical addresses received by the interface unit to the one specific physical block.

13. The controller according to claim 11, wherein in the management of the one specific physical block, the page cache control unit allocates the two or more specific logical addresses to the one specific physical block, wherein when data is written to the non-volatile memory, the one specific physical block temporarily holds the data.

14. The controller according to claim 11, wherein each of the two or more specific logical addresses is an address indicating an area in which file system management information is stored.

15. The controller according to claim 11, wherein
the page cache control unit is configured to:
determine whether a target area to which the data is written corresponds to any one of the two or more specific logical addresses,
if the target area corresponds to any one of the two or more specific logical addresses, write the data to the one specific physical block, and
if the target area does not correspond to any one of the two or more specific logical addresses, write the data to a physical block other than the one specific physical block.

16. The controller according to claim 11, wherein each of the two or more specific logical addresses is an address indicating an area in which a directory entry is stored.

17. An information recording system having an information recording device and an access device that accesses the information recording device, the information recording device comprising:
a non-volatile memory formed by a plurality of uniform physical blocks to which data is to be written, the plurality of uniform physical blocks including one specific physical block; and
a page cache control unit that, based on page cache information including information that allocates two or more specific logical addresses to the one specific physical block, manages the one specific physical block, the one specific physical block temporarily holding data to be recorded by the two or more specific logical addresses, and the access device comprising:
a page cache information setting unit that notifies the information recording device of the two or more specific logical addresses allocated to the one specific physical block, said notification occurring prior to execution of processing for writing data to the non-volatile memory,
wherein when the data is written to the non-volatile memory, the one specific physical block temporarily holds the data,
when the information recording device writes updated data for one of the two or more specific logical addresses, if the one specific physical block has no free area, the information recording device obtains a new physical block,
after writing the updated data to the new physical block from a head of the new physical block, the information recording device subsequently writes data for any other one of the two or more specific logical addresses to the new physical block.

18. The information recording system according to claim 17, wherein the information recording device comprises a memory control unit that records the page cache information to the non-volatile memory.

19. The information recording system according to claim 17, wherein the page cache control unit is configured to:
determine whether a target area to which the data is written corresponds to any one of the two or more specific logical addresses,
if the target area corresponds to any one of the two or more specific logical addresses, write the data to the one specific physical block, and
if the target area does not correspond to any one of the two or more specific logical addresses, write the data to a physical block other than the one specific physical block.

20. The information recording system according to claim 17, wherein each of the two or more specific logical addresses is an address indicating an area in which a directory entry is stored.

* * * * *